United States Patent [19]
Kawamonzen et al.

[11] Patent Number: 5,756,650
[45] Date of Patent: May 26, 1998

[54] POLYIMIDE PRECURSOR COMPOSITION, METHOD OF FORMING POLYIMIDE FILM, ELECTRONIC PARTS AND LIQUID CRYSTAL ELEMENT

[75] Inventors: Yoshiaki Kawamonzen, Kawasaki; Masayuki Oba, Yokohama; Satoshi Mikoshiba, Yokohama; Shigeru Matake, Yokohama, all of Japan

[73] Assignee: Kabushiki Kaisha Toshiba, Kawasaki, Japan

[21] Appl. No.: 816,595

[22] Filed: Mar. 13, 1997

[30]  Foreign Application Priority Data

Mar. 14, 1996 [JP] Japan .................................. 8-057530
Mar. 10, 1997 [JP] Japan .................................. 9-055216

[51]  Int. Cl.⁶ .................................................. C08G 73/10
[52]  U.S. Cl. .......................... 528/353; 428/395; 428/411.1; 428/473.5; 430/170; 430/191; 430/192; 430/270.1; 528/170; 528/172; 528/173; 528/176; 528/183; 528/185; 528/188; 528/220; 528/229; 528/310; 528/322; 528/342
[58]  Field of Search ........................... 528/353, 170, 528/172, 173, 176, 183, 185, 188, 220, 229, 310, 322, 342; 428/395, 411.1, 473.5; 430/170, 191, 192, 270.1

[56]  References Cited

U.S. PATENT DOCUMENTS 5,578,697  11/1996  Kawamonzen et al. .
5,585,217  12/1996  Oba .

OTHER PUBLICATIONS

Masayuki Oba, "Effect of Curing Accelerators on Thermal Imidization of Polyamic Acids at Low Temperature", Journal of Polymer Science: Part A: Polymer Chemistry, vol. 34, 1996, pp. 651–658.

M. Oba, "Effect of Cure Accelerator on Imidization of Polyamic Acid at Low Temperature", Polymer Preprints, Japan, vol. 43, No. 7, 1994, pp. 2087–2088.

Masayuki Oba, et al., "Synthesis and Evaluation of Positive-Acting Photosensitive Polyimides with Phenol Moiety", Journal of Applied Polymer Science, vol. 58, 1995, pp. 1535–1542.

M. Oba, "Synthesis and Characterization of Positive Working Photosensitive Polyimide", Polymer Preprints, Japan, vol. 42, No. 7, 1993, pp. 2691–2693.

*Primary Examiner*—John M. Cooney, Jr.
*Attorney, Agent, or Firm*—Oblon, Spivak, McClelland, Maier & Neustadt, P.C.

[57]  ABSTRACT

A polyimide precursor composition, which comprises, a polyamic acid having a repeating unit represented by the following general formula (PA), and at least one kinds of cure accelerator selected from the group consisting of a substituted or unsubstituted nitrogen-containing heterocyclic compound exhibiting an acid dissociation index "pKa" of a proton complex ranging from 0 to 8 in an aqueous solution thereof, or an N-oxide compound of said nitrogen-containing heterocyclic compound (AC1), a substituted or unsubstituted amino acid compound (AC2), and an aromatic hydrocarbon compound or an aromatic heterocyclic compound having a molecular weight of 1,000 or less and two or more hydroxyl groups (AC3):

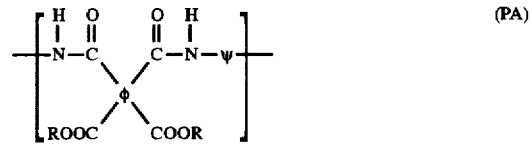

(PA)

wherein φ is a quadrivalent organic group, φ is a bivalent organic group, R is a substituted or unsubstituted hydrocarbon group, organosilicic group or hydrogen atom.

20 Claims, 5 Drawing Sheets

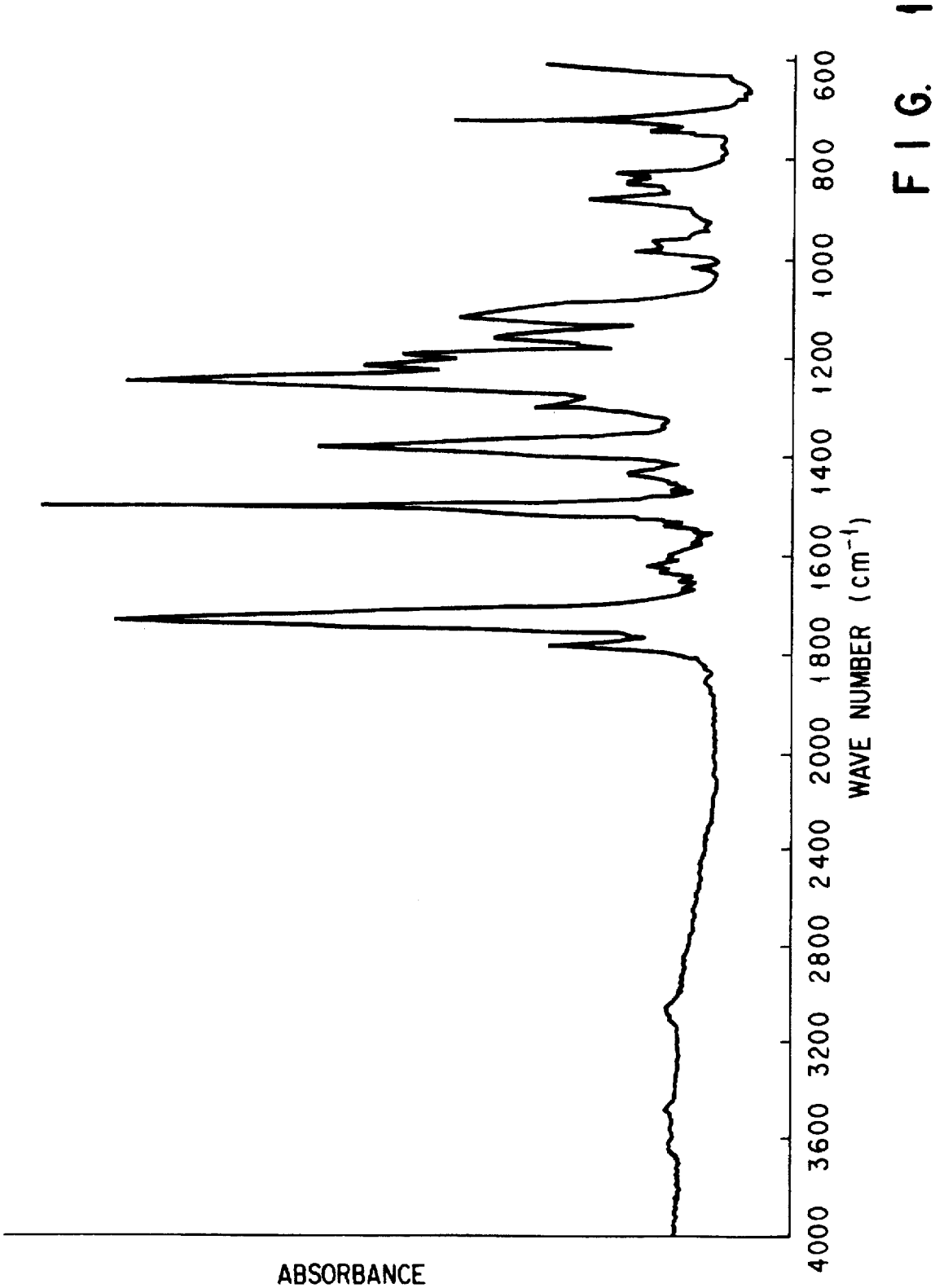
F I G. 1

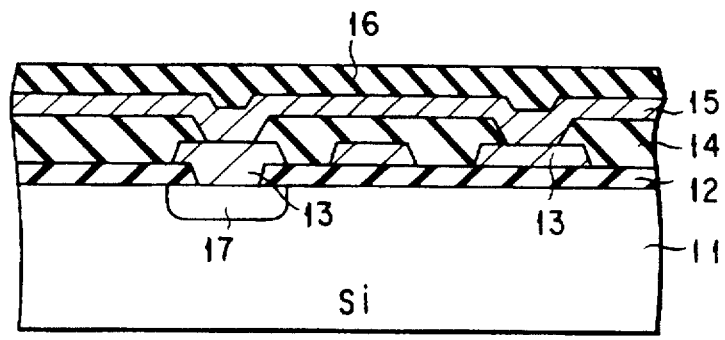
F I G. 4
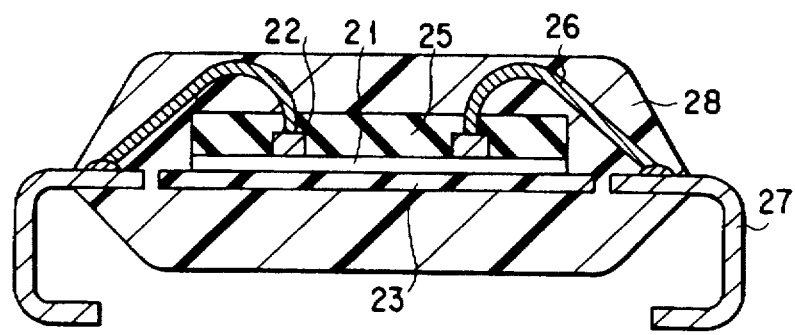
F I G. 5
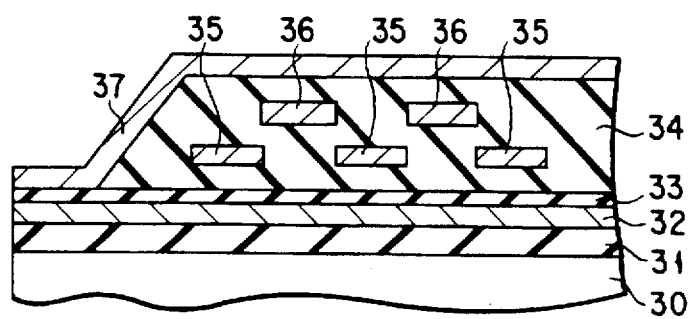
F I G. 6

POLYIMIDE PRECURSOR COMPOSITION, METHOD OF FORMING POLYIMIDE FILM, ELECTRONIC PARTS AND LIQUID CRYSTAL ELEMENT

BACKGROUND OF THE INVENTION

This invention relates to a polyimide precursor composition which is suited for use in the formation of various kinds of insulation member, and to a method of forming a polyimide film by making use of the aforementioned polyimide precursor composition. This invention relates also to electronic parts provided with an insulation film or passivation film which is formed of a cured polyimide. This invention further relates to a liquid crystal element provided with a liquid crystal orienting film which is formed of a cured polyimide.

The liquid crystal of liquid crystal element is required to be suitably oriented. For the purpose of this requirement, a method has been popularly adopted, the steps of which comprises coating a polyamic acid varnish on the surface of an ITO transparent electrode formed on a transparent substrate, imidating the polyamic acid thereby to form a polyimide film, and rubbing the polyimide film thus obtained. However, since this method requires a heat treatment at a high temperature of 300° C. or more at the occasion of imidating the polyamic acid, there has been a possibility of discoloring the color filter to be mounted on a color liquid crystal display device.

With a view to overcome this problem, there has been tried to coat a polyimide resin varnish which is soluble to an organic solvent directly on the surface of substrate thereby to form a polyimide film thereon. However, this method of employing such a polyimide resin is accompanied with a problem as it is applied to a dual-domain technique for orienting a liquid crystal in two different directions within each pixel. Namely, for the purpose of achieving a dual-domain, the polyimide film is at first subjected to a rubbing treatment in one direction, and after a photoresist is formed to cover a half of each pixel, the polyimide film is again subjected to a rubbing treatment in another direction with the photoresist being used as a mask. In this case, the polyimide resin which is soluble to an organic solvent is corroded by a developing solution at the occasion of forming a photoresist pattern for covering a half of each pixel by means of light exposure and development. As a result, the display property of the resultant liquid display device would be deteriorated.

As mentioned above, the utilization of a polyimide film for a liquid crystal orienting film of liquid crystal element is accompanied with a problem for instance that a heat treatment at a high temperature is required for imidating polyamic acid. On the other hand, the integration of electronic parts has been advancing still further in recent years as represented by a semiconductor device, so that the width of line-and-space of wiring pattern is now being approached to the order of a quarter micron. As a result of this trend of narrowing line-and-space width, along with a high relative dielectric constant (i.e. 3.5 or more) of interlayer insulating film formed of $SiO_2$, an increase in delay time as well as an increase in power consumption have become serious problems. Under the circumstances, the employment, as an interlayer insulating film, of an organic polymer film which is capable of achieving a low relative dielectric constant has been studied. Since such an interlayer insulating film is required to be heat-resistive at a temperature of 400° C. or more, a polyimide film excellent in heat resistance is now studied for use also as an interlayer insulating film. However, even in the case of applying a polyimide film as an interlayer insulating film or as a passivation film in the electronic parts, a high temperature heat treatment is also required at the occasion of imidating polyamic acid, thereby giving rise to the problem of generating a thermal stress in the manufacturing process of a semiconductor device.

This invention has been accomplished in view of the aforementioned problems, and therefore the object of this invention is to provide a polyimide precursor composition which is capable of forming a polyimide film by a heat treatment of low temperature. Other object of this invention is to provide a method of forming a polyimide film with the employment of the aforementioned polyimide precursor composition. Further object of this invention is to provide, by making use of the aforementioned polyimide precursor composition, a highly reliable electronic parts or liquid crystal element having, on its silicon substrate or a glass substrate, an insulating film, a passivation film or a liquid crystal orienting film each being formed of a polyimide film which is excellent in dielectric property, humidity resistance and environmental stability, thereby making it possible to realize a high speed operation and power saving.

BRIEF SUMMARY OF THE INVENTION

According to this invention, there is provided a polyimide precursor composition, which comprises a polyamic acid having a repeating unit represented by the following general formula (PA); and at least one kinds of cure accelerator selected from the group consisting of a substituted or unsubstituted nitrogen-containing heterocyclic compound exhibiting an acid dissociation index "pKa" of a protone complex ranging from 0 to 8 in an aqueous solution thereof, or an N-oxide compound of said nitrogen-containing heterocyclic compound (hereinafter referred to as AC1); a substituted or unsubstituted amino acid compound (hereinafter referred to as AC2); and an aromatic hydrocarbon compound or an aromatic heterocyclic compound having a molecular weight of 1,000 or less and two or more hydroxyl groups (hereinafter referred to as AC3):

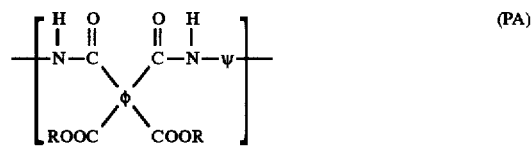

(PA)

wherein $\phi$ is a quadrivalent organic group; $\varphi$ is a bivalent organic group; R is a substituted or unsubstituted hydrocarbon group, organosilicic group or hydrogen atom.

According to this invention, there is further provided a method of forming a polyimide film, which comprises the steps of; coating the aforementioned polyimide precursor composition on a surface of an object to be coated; and heating the polyimide precursor composition at a temperature ranging from 60° to 400° C. thereby curing the polyimid precursor composition.

According to this invention, there is further provided electronic parts which are provided with a polyimide film functioning as an insulating film or a passivation film, said polyimide film being formed through a curing of the aforementioned polyimide precursor composition.

According to this invention, there is further provided a liquid crystal element which is provided with a polyimide film functioning as a liquid crystal orienting film, said polyimide film being formed through a curing of the aforementioned polyimide precursor composition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a graph showing an IR spectrum of a polyimide film formed in Example 21 of this invention;

FIG. 4 is a cross-sectional view of a semiconductor element of multi-layered wiring structure provided with an interlayer insulating film formed of a polyimide film according to this invention;

FIG. 5 is a cross-sectional view of a semiconductor element provided with a passivation film formed of a polyimide film according to this invention;

FIG. 6 is a cross-sectional view of a thin film magnetic head provided with an interlayer insulating film formed of a polyimide film according to this invention;

DETAILED DESCRIPTION OF THE INVENTION

Figure 2:
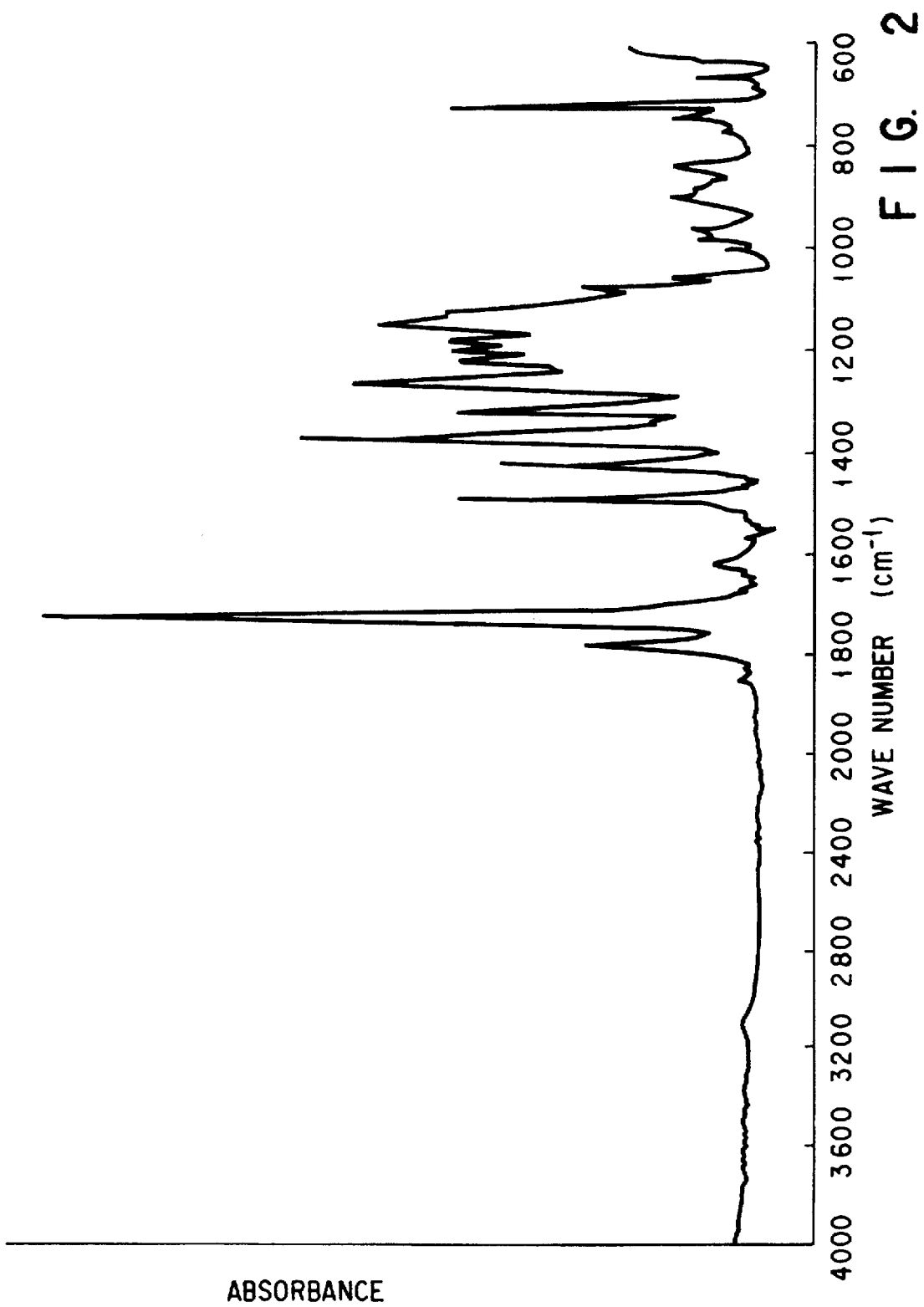
FIG. 2 is a graph showing an IR spectrum of a polyimide film formed in Example 42 of this invention.

This invention will be further explained as follows.

The organic compounds selected from a substituted or unsubstituted nitrogen-containing heterocyclic compound exhibiting an acid dissociation index "pKa" of a proton complex ranging from 0 to 8 in an aqueous solution thereof, or an N-oxide compound of the nitrogen-containing heterocyclic compound (AC1); a substituted or unsubstituted amino acid compound (AC2); and an aromatic hydrocarbon compound or an aromatic heterocyclic compound having a molecular weight of 1,000 or less and two or more hydroxyl groups (AC3) are all a low temperature cure accelerator which is capable of promoting the curing reaction of polyamic acid at a low temperature.

First of all, the substituted or unsubstituted nitrogen-containing heterocyclic compound exhibiting an acid dissociation index "pKa" of a proton complex ranging from 0 to 8 in an aqueous solution thereof (AC1) will be explained as follows. The acid dissociation index "pKa" as recited herein means a logarithm of the reciprocal of the dissociation constant "Ka" (–log Ka). This nitrogen-containing heterocyclic compound useful as a low temperature cure accelerator in this invention should be selected from those exhibiting an acid dissociation index of a proton complex in an aqueous solution ranging from 0 to 8, preferably 2.5 to 7. The reason for this is that if the acid dissociation index of a proton complex of the nitrogen-containing heterocyclic compound is too small, it is difficult to sufficiently promote the curing reaction of the polyamic acid at a low temperature, whereas if the acid dissociation index of the nitrogen-containing heterocyclic compound is too large, the gelation of the polyamic acid can be easily proceeded, thus possibly deteriorating the storage stability of the polyimide precursor composition.

Examples of the unsubstituted nitrogen-containing heterocyclic compound meeting the (AC1) are imidazole, pyrazole, triazole, tetrazole, benzimidazole, naphthimidazole, indazole, benzotriazole, purine, imidazoline, pyrazoline, pyridine, quinoline, isoquinoline, dipyridyl, diquinolyl, pyridazine, pyrimidine, pyrazine, phthalazine, quinoxaline, quinazoline, cinnoline, naphthylidine, acridine, phenanthridine, benzoquinoline, benzisoquinoline, benzocinnoline, benzophthalazine, benzoquinoxaline, benzoquinazoline, phenanthroline, phenazine, carboline, perimidine, triazine, tetrazine, pteridine, oxazole, benzoxazole, isoxazole, benzisoxazole, thiazole, benzothiazole, isothiazole, benzisothiazole, oxadiazole, thiadiazole, pyrroledione, isoindoledione, pyrrolidinedione, benzisoquinolinedione, triethylenediamine, and hexamethylenetetramine. These compounds may be in the form of an N-oxide compound.

Examples of a substituent group to be introduced into these nitrogen-containing heterocyclic compounds so as to form a substituted nitrogen-containing heterocyclic compound are characteristic group such as di-substituted amino group (dimethylamino, diethylamino, dibutylamino, ethylmethylamino, butylmethylamino, diamylamino, dibenzylamino, diphenethylamino, diphenylamino, ditolylamino, dixylylamino, methylphenylamino and benzylmethylamino group); mono-substituted amino group (methylamino, ethylamino, propylamino, isopropylamino, tert-butylamino, anilino, anisidino, phenetidino, toluidino, xylidino, pyridylamino, thiazolylamino, benzylamino and benzylideneamino group); cyclic amino group (pyrrolidino, piperidino, piperazino, morpholino, 1-pyrrolyl, 1-pyrazolyl, 1-imidazolyl and 1-triazolyl group); acylamino group (formylamino, acetylamino, benzoylamino, cinnamoylamino, pyridinecarbonylamino and trifluoroacetylamino group); sulfonylamino group (mesylamino, ethylsulfonylamino, phenylsulfonylamino, pyridylsufonylamino, tosylamino, taurylamino, trifluoromethylsulfonylamino, sulfamoylamino, methylsulfamoylamino, sulfanylamino and acetylsulfanylamino group); amino group; hydroxyamino group; ureido group; semicarbazido group; di-substituted hydrazino group (dimethylhydrazino, diphenylhydrazino and methylphenylhydrazino group); mono-substituted hydrazino group (methylhydrazino, phenylhydrazino, pyridylhydrazino and benzylidenehydrazino group); hydrazino group; amidino group; hydroxyl group; oxime group (hydroxyiminomethyl, methoxyiminomethyl, ethoxyiminomethyl, hydroxyiminoethyl and hydroxyiminopropyl group); hydroxyalkyl group (hydroxymethyl, hydroxyethyl and hydroxypropyl group); hydroxyaryl group (hydroxyphenyl, hydroxynaphthyl and dihydroxyphenyl group); alkoxyalkyl group (methoxymethyl, methoxyethyl and ethoxyethyl group); cyano group; cyanato group; thiocyanato group; nitro group; nitroso group; oxy group (methoxy, ethoxy, propoxy, butoxy, hydroxyethoxy, phenoxy, naphthoxy, pyridyloxy, thiazolyloxy and acetoxy group); thio group (methylthio, ethylthio, phenylthio, pyridylthio and thiazolylthio group);

mercapto group; halogen group (fluoro, chloro, bromo and iodo group); carboxyl group and the salts thereof; oxycarbonyl group (methoxycarbonyl, ethoxycarbonyl, phenoxycarbonyl and pyridyloxycarbonyl group); aminocarbonyl group (carbamoyl, methylcarbamoyl, phenylcarbamoyl, pyridylcarbamoyl, carbazoyl, allophanoyl, oxamoyl and succinamoyl group); thiocarboxyl group and the salts thereof; dithiocarboxyl group and the salts thereof; thiocarbonyl group (methoxythiocarbonyl, methylthiocarbonyl and methylthiothiocarbonyl group); acyl group (formyl, acetyl, propionyl, acryloyl, benzoyl, cinnamoyl, pyridinecarbonyl, thiazolecarbonyl and trifluoroacetyl group); thioacyl group (thioformyl, thioacetyl, thiobenzoyl and pyridinethiocarbonyl); sulfinio group and the salts thereof; sulfo group and the salts thereof; sulfinyl group (methylsulfinyl, ethylsulfinyl and phenylsulfinyl group); sulfonyl group (mesyl, ethylsulfonyl, phenylsulfonyl, pyridylsulfonyl, tosyl, tauryl, trifluoromethylsulfonyl, sulfamoyl, methylsulfamoyl, sulfanilyl and acetylsulfanilyl group); oxysulfonyl group (methoxysulfonyl, ethoxysulfonyl, phenoxysulfonyl, acetaminophenoxysulfonyl and pyridyloxysulfonyl group); thiosulfonyl group (methylthiosulfonyl, ethylthiosulfonyl, phenylthiosulfonyl, acetaminophenylthiosulfonyl and pyridylthiosulfonyl group); aminosulfonyl group (sulfamoyl, methylsulfamoyl, dimethylsulfamoyl, ethylsulfamoyl, diethylsulfamoyl, phenylsulfamoyl, acetaminophenylsulfamoyl and pyridylsulfamoyl group); ammonio group (trimethylammonio, ethyldimethylammonio, dimethylsulphenylammonio, pyridinio and quinolinio group); azo group (phenylazo, pyridylazo and thiazolylazo group); azoxy group; alkyl halide group (chloromethyl, bromomethyl, fluoromethyl, dichloromethyl, dibromomethyl, difluoromethyl, trifluoromethyl, pentafluoroethyl and heptafluoropropyl group); hydrocarbon group (alkyl, aryl, alkenyl and alkynyl group); heterocyclic group; organosilicic group (silyl, disilanyl, trimethylsilyl and triphenylsilyl group). Preferable examples among these substituent groups are hydroxyl group, oxy group, oxime group, carboxyl group, aminocarbonyl group, hydroxyalkyl group, hydroxyaryl group, di-substituted amino group, mono-substituted amino group, cyclic amino group, acylamino group, amino group, hydroxyamino group, ureido group, nitro group, cyano group, acyl group, sulfo group, aminosulfonyl group, azo group, mercapto group and thio group.

Next, the substituted or unsubstituted amino acid compound (AC2) to be utilized as a cure accelerator in this invention will be explained as follows.

Examples of the unsubstituted amino acid compound falling within the definition of (AC2) are glycine, sarcosine, dimethylglycine, betaine, alanine, β-alanine, α-aminobutyric acid, β-aminobutyric acid, γ-aminobutyric acid, γ-amino-β-oxobutyric acid, valine, β-aminoisovaleric acid, γ-aminoisovaleric acid, norvaline, β-aminovaleric acid, γ-aminovaleric acid, δ-aminovaleric acid, leucine, isoleucine, norleucine, serine, α-methylserine, isoserine, α-methylisoserine, cycloserine, homoserine, threonine, o-methylthreonine, allothreonine, o-methylallothreonine, roseonine, trans-3-aminocyclohexane carboxylic acid, cis-3-aminocyclohexane carboxylic acid, ε-amine caproic acid, ω-aminododecanoic acid, β-hydroxyvaline, β-hydroxyisoleucine, α-hydroxy-β-aminoisovalerianic acid, ε-diazo-δ-oxonorleucine, α-amino-ε-hydroxyaminocaproic acid, cysteine, cystine, S-methylcysteine, S-methylcysteine-S-oxide, cysteic acid, homocysteine, homocystine, methionine, penicillamine, taurine, α,β-diaminopropionic acid, ornithine, lysine, arginine, canaline, canavanine, δ-hydroxylysine, aspartic acid, asparagine, isoasparagine, glutamic acid, glutamine, isoglutamine, α-methylglutamic acid, β-hydroxyglutamic acid, γ-hydroxyglutamic acid, α-aminoadipic acid, citrulline, lanthionine, cystathionine, phenylalanine, α-methylphenylalanine, o-chlorophenylalanine, m-chlorophenylalanine, p-chlorophenylalanine, o-fluorophenylalanine, m-fluorophenylalanine, p-fluorophenylalanine, β-(2-pyridyl)alanine, tyrosine, thyronine, dichlorotyrosine, dibromotyrosine, diiodotyrosine, 3,4-dihydroxyphenylalanine, α-methyl-3,4-dihydroxyphenylalanine, phenylglycine, tryptophan, abrine, histidine, 1-methylhistidine, 2-mercaptohistidine, proline, hydroxyproline, anthranilic acid and paraminol.

Examples of a substituent group introduced into these unsubstituted amino acid compounds so as to form a substituted amino acid compounds are aforementioned characteristic groups.

A preferable cure accelerator containing the above-mentioned substituted or unsubstituted amino acid compound (AC2) includes N-acylamino acid compound in which the amino group of the amino acid compound is substituted with an acyl group, N-aryl (or heteroaryl) amino acid compound in which the amino group of the amino acid compound is substituted with an aromatic hydrocarbon group or aromatic heterocyclic group. Examples of such an acyl group which can be introduced into the N-acylamino acid compound are formyl, acetyl, propionyl, butyryl, isobutyryl, valeryl, isovaleryl, pivaloyl, lauroyl, myristoyl, palmitoyl, stearoyl, acryloyl, propioloyl, methacryloyl, crotonoyl, isocrotonoyl, oleoyl, cyclopentanecarbonyl, cyclohexanecarbonyl, benzoyl, naphthoyl, toluoyl, hydroatropoyl, atropoyl, cinnamoyl, furoyl, thenoyl, picolinoyl, nicotinoyl, isonicotinoyl, quinolinecarbonyl, pyridazinecarbonyl, pyrimidinecarbonyl, pyrzainecarbonyl, imidazolecarbonyl, benzimidazolecarbonyl, thiazolecarbonyl, benzothiazolecarbonyl, oxazolecarbonyl, benzoxazolecarbonyl, oxalyl, malonyl, succinyl, glutaryl, adipoyl, pimeloyl, suberoyl, azelaoyl, sebacoyl, maleoyl, fumaroyl, citraconoyl, mesaconoyl, mesoxalyl, oxalacetyl, camphoroyl, phthaloyl, isophthaloyl, terephthaloyl, oxalo, methoxalyl, ethoxalyl, glyoxyloyl, pyruvoyl, acetoacetyl, mesoxalo, oxalaceto, cysteinyl, homocysteinyl, tryptophyl, alanyl, β-alanyl, arginyl, cystathionyl, cystyl, glycyl, histidyl, homoseryl, isoleucyl, lanthionyl, leucyl, lysyl, methionyl, norleucyl, norvalyl, ornithyl, prolyl, sarcosyl, seryl, threonyl, thyronyl, tyrosyl and valyl.

Examples of an unsubstituted aromatic hydrocarbon group or an unsubstituted aromatic heterocyclic group introduced into the N-aryl (or heteroaryl) amino acid compound are benzene ring, naphthalene ring, anthracene ring, phenanthrene ring, tetralin ring, azulene ring, biphenylene ring, acenaphythylene ring, acenaphthene ring, fluorene ring, triphenylene ring, pyrene ring, chrysene ring, picene ring, perylene ring, benzopyrene ring, rubicene ring, coronene ring, ovalene ring, indene ring, pentalene ring, heptalene ring, indacene ring, phenalene ring, fluoranthene ring, acephenanthrylene ring, aceanthrylene ring, naphthacene ring, pleiadene ring, pentaphene ring, pentacene ring, tetraphenylene ring, hexaphene ring, hexacene ring, trinaphthylene ring, heptaphene ring, heptacene ring, pyranthrene ring, pyrrole ring, indole ring, isoindole ring, carbazole ring, carboline ring, furan ring, coumarone ring, isobenzofuran ring, thiophene ring, benzothiophene ring, dibenzothiophene ring, pyrazole ring, indazole ring, imidazole ring, benzimidazole ring, oxazole ring, benzoxazole ring, benzoxazoline ring, isoxazole ring, benzisoxazole ring, thiazole ring, benzothiazole ring, benzothiazoline ring, isothiazole ring, benzisothiazole ring, triazole ring, benzotriazole ring, oxadiazole ring, thiadiazole ring, benzoxadiazole ring, benzothiadiazole ring, tetrazole ring, purine ring, pyridine ring, quinoline ring, isoquinoline ring, acridine ring, phenanthridine ring, benzoquinoline ring, benzisoquinoline, naphthylidine ring, phenanthroline ring, pyridazine ring, pyrimidine ring, pyrazine ring, phthalazine ring, quinoxaline ring, quinazoline ring, cinnoline ring, phenazine ring, perimidine ring, triazine ring, tetrazine ring, pteridine ring, benzoxazine ring, phenoxazine ring, benzothiazine ring, phenothiazine ring, oxadiazine ring, thiadiazine ring, benzodioxole ring, benzodioxane ring, pyran ring, chromene ring, xanthene ring, chroman ring and isochroman ring. These aromatic hydrocarbon groups and aromatic heterocyclic groups may be substituted with various kinds of the aforementioned characteristic group.

Then, the aromatic hydrocarbon compound or aromatic heterocyclic compound (AC3) having a molecular weight of 1,000 or less and two or more hydroxy groups to be utilized as a cure accelerator in this invention will be explained as follows.

If the molecular weight of these compounds is too large, it may invite a large amount of residue in a layer, because of rising a gasification temperature such as boiling point, sublimation temperature or decomposition temperature. Therefore, the molecular weight of the compounds of (AC3) should preferably be limited to the range of 1,000 or less.

Furthermore, so as to obtain an excellent accelerating ability, the compounds of (AC3) require to contain two or more hydroxyl groups in their molecules.

The examples of (AC3) include polyhydroxy compounds represented by the following general formula (PHD).

(PHD)

wherein $Ar^1$ and $Ar^2$ may be the same or different and are individually a substituted or unsubstituted aromatic hydrocarbon group or aromatic heterocyclic ring; $X^1$ may be the same or different and is selected from a bivalent organic group and a single bond; u represents 0 or 1; and v and w are integers ranging from 0 to 5 and meet the condition of $v+w \geq 2$.

Examples of the unsubstituted aromatic hydrocarbon group to be introduced as the $Ar^1$ and $Ar^2$ into the aforementioned general formula (PHD) are benzene ring, naphthalene ring, anthracene ring, phenanthrene ring, tetralin ring, azulene ring, biphenylene ring, acenaphthylene ring, acenaphthene ring, fluorene ring, triphenylene ring, pyrene ring, chrysene ring, picene ring, perylene ring, benzopyrene ring, rubicene ring, coronene ring, ovalene ring, indene ring, pentalene ring, heptalene ring, indacene ring, phenalene ring, fluoranthene ring, acephenanthrylene ring, aceanthrylene ring, naphthacene ring, pleiadene ring, pentaphene ring, pentacene ring, tetraphenylene ring, hexaphene ring, hexacene ring, trinaphthylene ring, heptaphene ring, heptacene ring and pyranthrene ring.

Examples of substituent groups that can be introduced into the aforementioned unsubstituted aromatic hydrocarbon groups so as to form substituted aromatic hydrocarbon groups are cyano group; cyanato group; thiocyanato group; nitro group; nitroso group; oxy group (methoxy, ethoxy, propoxy, butoxy, hydroxyethoxy, phenoxy, naphthoxy, pyridyloxy, thiazolyloxy and acetoxy group); thio group (methylthio, ethylthio, phenylthio, pyridylthio and thiazolylthio group); mercapto group; halogen group (fluoro, chloro, bromo and iodo group); carboxyl group and the salts thereof; oxycarbonyl group (methoxycarbonyl, ethoxycarbonyl, phenoxycarbonyl and pyridyloxycarbonyl group); aminocarbonyl group (carbamoyl, methylcarbamoyl, phenylcarbamoyl, pyridylcarbamoyl, carbazoyl, allophanoyl, oxamoyl and succinamoyl group); thiocarboxyl group and the salts thereof; dithiocarboxyl group and the salts thereof; thiocarbonyl group (methoxythiocarbonyl, methylthiocarbonyl and methylthiothiocarbonyl group); acyl group (formyl, acetyl, propionyl, acryloyl, benzoyl, cinnamoyl, pyridinecarbonyl, thiazolecarbonyl and trifluoroacetyl group); thioacyl group (thioformyl, thioacetyl, thiobenzoyl and pyridinethiocarbonyl); sulfino group and the salts thereof; sulfo group and the salts thereof; sulfinyl group (methylsulfinyl, ethylsulfinyl and phenylsulfinyl group); sulfonyl group (mesyl, ethylsulfonyl, phenylsulfonyl, pyridylsulfonyl, tosyl, tauryl, trifluoromethylsulfonyl, sulfamoyl, methylsulfamoyl, sulfanilyl and acetylsulfanilyl group); oxysulfonyl group (methoxysulfonyl, ethoxysulfonyl, phenoxysulfonyl, acetaminophenoxysulfonyl and pyridyloxysulfonyl group); thiosulfonyl group (methylthiosulfonyl, ethylthiosulfonyl, phenylthiosulfonyl, acetaminophenylthiosulfonyl and pyridylthiosulfonyl group); aminosulfonyl group (sulfamoyl, methylsulfamoyl, dimethylsulfamoyl, ethylsulfamoyl, diethylsulfamoyl, phenylsulfamoyl, acetaminophenylsulfamoyl and pyridylsulfamoyl group); ammonio group (trimethylammonio, ethyldimethylammonio, dimethylphenylammonio, pyridinio and quinolinio group); azo group (phenylazo, pyridylazo and thiazolylazo group); azoxy group; alkyl halide group (chloromethyl, bromomethyl, fluoromethyl, dichloromethyl, dibromomethyl, difluoromethyl, trifluoromethyl, pentafluoroethyl and heptafluoropropyl group); hydrocarbon group (alkyl, aryl, alkenyl and alkynyl group); heterocyclic group; organosilicic group (silyl, disilanyl, trimethylsilyl and triphenylsilyl group).

Specific examples of the unsubstituted aromatic heterocyclic group to be introduced as the $Ar^1$ and $Ar^2$ into the aforementioned general formula (PHD) are pyrrole ring, indole ring, isoindole ring, carbazole ring, furan ring, coumarone ring, isobenzofuran ring, thiophene ring, benzothiophene ring, dibenzothiophene ring, oxazine ring, benzoxazine ring, phenoxazine ring, thiazine ring, benzothiazine ring, phenothiazine ring, oxadiazine ring, thiadiazine ring, benzodioxole ring, benzodioxane ring, pyran ring, chromene ring, xanthene ring, chroman ring and isochroman ring. These heterocyclic groups may be substituted by various kinds of the aforementioned characteristic group.

Specific examples of the bivalent group to be introduced as the $X^1$ into the aforementioned general formula (PHD) are bivalent oxy group, thio group, sulfinyl group, sufonyl group, carbonyl group, carbonyloxy group, oxycarbonyloxy group, peralkylpolysiloxanediyl group (1,1,3,3-tetramethyldisiloxane-1,3-diyl, 1,1,3,3,5,5-hexamethyltrisiloxane-1,5-diyl, 1,1,3,3,5,5,7,7-octamethyltetrasiloxane-1,7-diyl, etc.), substituted or unsubstituted imino group (imino, methylimino, ethylimino, propylimino, phenylimino, etc.), substituted or unsubstituted aliphatic hydrocarbon group (methylene, ethylene, propylene, butylene, pentylene, ethylidene, propylidene, butylidene, pentylidene, vinylene, difluoromethylene, tetrafluoroethylene, hexafluoropropylene, octafluorobutylene, decafluoropentylene, tetrafluoroethylidene, hexafluoropropylidene, octafluorobutylidene, decafluoropentylidene, etc.), substituted or unsubstituted alkylenedioxy group (methylenedioxy, ethylenedioxy, propylenedioxy, butylenedioxy, pentylenedioxy, ethylidenedioxy, propylidenedioxy, butylidenedioxy, pentylidenedioxy, etc.), azo group, azoxy group and azomethine group.

A preferable examples of the above-mentioned aromatic hydrocarbon compound or aromatic heterocyclic compound having a molecular weight of 1,000 or less and two or more hydroxy groups and functioning as a cure accelerator includes a two or more hydroxyl group-substituted aromatic ring compound, i.e. a compound which can be obtained by the introduction of two or more hydroxyl groups as a substituent group into an aromatic ring compound, such as benzene, naphthalene, anthracene, anthraquinone, phenanthrene, phenanthrenequinone, fluorene, fluorenone, pyrrole, indole, isoindole, carbazole, furan, coumarone, isobenzofuran, thiophene, benzothiophene, dibenzothiophene, benzodioxole, benzodioxane, biphenyl, acetophenone, propiophenone, butyrophenone, benzophenone, benzoic ester, benzene dicarboxylic diester, benzamide, benzonitrile, benzaldehyde, alkoxybenzene, benzyl alcohol, nitrobenzene, benzenesulfonic acid, aniline, diphenyl ether, diphenylsulfone, diphenylmethane, diphenylethane, diphenyldifluoromethane, diphenyltetrafluoroethane, diphenylhexafluoropropane, diphenylamine, diphenylmethylamine, triphenylamine, triphenylmethane, triphenyl methanol and fuchsone.

These low temperature cure accelerators represented by (AC1), (AC2) or (AC3) may be employed singly or in combination of two or more kinds.

This low temperature cure accelerator should preferably be low in gasification temperature (boiling point, sublimation point or decomposition point), and excellent in cure-accelerating effects and in solubility to a polyamic acid solution. Particularly preferable examples of the low temperature cure accelerator in viewpoint of these desired properties are imidazole, 1,2,4-triazole, benzimidazole, naphthimidazole, purine, quinoline, isoquinoline, pyridazine, phthalazine, quinazoline, cinnoline, naphthylidine, acridine, phenanthridine, benzoquinoline, benzisoquinoline, benzocinnoline, benzophthalazine, benzoquinazoline, phenanthroline, phenazine, carboline, perimidine, 2,2'-dipyridyl, 2,4'-dipyridyl, 4,4'-dipyridyl, 2,2'-diquinolyl, 2-hydroxypyridine, 3-hydroxypyridine, 4-hydroxypyridine, 2-hydroxyquinoline, 3-hydroxyquinoline, 4-hydroxyquinoline, 5-hydroxyquinoline, 6-hydroxyquinoline, 7-hydroxyquinoline, 8-hydroxyquinoline, picolin amide, nicotinamide, isonicotinamide, N,N-dimethylnicotinamide, N,N-diethylnicotinamide, N,N-dimethylisonicotinamide, N,N-diethylisonicotinamide, hydroxynicotinic acid, picolinic ester, nicotinic ester, isonicotinic ester, 2-pyridine sulfonamide, 3-pyridine sulfonamide, 4-pyridine sulfonamide, picolinaldehyde, nicotinaldehyde, isonicotinaldehyde, 3-nitropyridine, 3-acetoxypyridine, 2-aminopyridine, 3-aminopyridine, 4-aminopyridine, picolinaldoxime, nicotinaldoxime, isonicotinaldoxime, 2-(hydroxymethyl)pyridine, 3-(hydroxymethyl)pyridine, 4-(hydroxymethyl)pyridine, 2-(hydroxyethyl)pyridine, 3-(hydroxyethyl)pyridine, 4-(hydroxyethyl)pyridine, 3-hydroxypyridine-N-oxide, 4-hydroxypyridine-N-oxide, 4-hydroxyquinoline-N-oxide, N-hydroxypyrrole-2,5-dione, N-hydroxyisoindole-1,3-dione, N-hydroxypyrrolidine-2,5-dione, N-hydroxybenz[de]isoquinoline-1,3-dione, triethylenediamine, hexamethylenetetramine, hydantoin, histidine, uracil, barbituric acid, dialuric acid, cytosine, anilinoacetic acid, N-(2-pyridyl)glycine, tryptophan, proline, N-acetylglycine, hippuric acid, N-picolinoylglycine, N-nicotinoylglycine, N-isonicotinoylglycine, N-acetylalanine, N-benzoylalanine, N-picolinoylalanine, N-nicotinoylalanine, N-isonicotinoylalanine, α-(acetylamino)butyric acid, α-(benzoylamino)butyric acid, α-(picolinoylamino)butyric acid, α-(nicotinoylamino)butyric acid, α-(isonicotinoylamino)butyric acid, N-acetylvaline, N-benzoylvaline, N-picolinoylvaline, N-nicotinoylvaline, benzenetriol, dihydroxyacetophenone, trihydroxyacetophenone, dihydroxybenzophenone, trihydroxybenzophenone, tetrahydroxybenzophenone, dihydroxybenzoic ester, trihydroxybenzoic ester, dihydroxybenzamide, trihydroxybenzamide, dihydroxybenzyl alcohol, trihydroxybenzyl alcohol, alkoxybenzenediol, alkoxybenzenetriol, dihydroxybenzaldehyde, trihydroxybenzaldehyde, nitrobenzenediol, dihydroxy-N,N-dimethylaniline, dihydroxydiphenylamine, trihydroxydiphenylamine, tetrahydroxydiphenylamine, dihydroxytriphenylamine, trihydroxytriphenylamine, tetrahydroxytriphenylamine, dihydroxybiphenyl, trihydroxybiphenyl, tetrahydroxybiphenyl, dihydroxydiphenyl ether, trihydroxydiphenyl ether, tetrahydroxydiphenyl ether, dihydroxydiphenylsulfone, trihydroxydiphenylsulfone, tetrahydroxydiphenylsulfone, dihydroxydiphenylmethane, trihydroxydiphenylmethane, tetrahydroxydiphenylmethane, dihydroxydiphenylethane, trihydroxydiphenylethane, tetrahydroxydiphenylethane, dihydroxydiphenylpropane, trihydroxydiphenylpropane, tetrahydroxydiphenylpropane, dihydroxydiphenylhexafluoropropane, trihydroxydiphenylhexafluoropropane, tetrahydroxydiphenylhexafluoropropane, triphenylmethanetriol, dihydroxyfuchsone, naphthalenediol, naphthalenetriol, naphthalenetetraol, anthracenediol, anthracenetriol, anthracenetetraol, fluorenediol, fluorenetriol, fluorenetetraol fluorenonediol, fluorenonetriol and fluorenonetetraol.

These low temperature cure accelerators should preferably be employed at a ratio of 0.1 molar equivalent or more, more preferably 0.2 to 4.0 molar equivalent, most preferably 0.5 to 2.5 molar equivalent per molar equivalent of the repeating unit of polyamic acid. The reason for limiting the content of the low temperature cure accelerator is that if this content of this low temperature cure accelerator is too small, a sufficient imidization of polyamic acid cannot be achieved in a low temperature heat treatment so that it becomes difficult to obtain a polyimide of excellent quality, whereas if the content of this low temperature cure accelerator is too large, the storage stability of the polyimide precursor composition would be deteriorated or the quantity of residue of the low temperature cure accelerator after the thermal curing would be increased, thereby possibly badly affecting the properties of the product to be obtained.

The polyamic acid to be employed in this invention is the one which can be obtained by polymerizing 0.8 to 1.2 molar equivalent of tetracarboxylic dianhydride component represented by the following general formula (DAH1) together with 0.8 to 1.2 molar equivalent of diamine compound component represented by the following general formula (DA1).

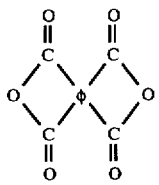

(DAH1)

H₂N-φ-NH₂     (DA1)

wherein φ is a quadrivalent organic group; and φ is a bivalent organic group.

If it is required for the purpose of controlling the molecular weight of polyamic acid in this invention, a dicarboxylic anyhydride or a monoamine compound may be added to the reaction mixture of this synthesis.

Principally, this polyamic acid can be obtained by polymerizing 1 molar equivalent of tetracarboxylic dianhydride component with 1 molar equivalent of diamine compound component. However, as matter of fact, it is possible to obtained a desired polyamic acid by setting the content of the diamine compound component to 0.8 to 1.2 molar equivalent per molar equivalent of the tetracarboxylic dianhydride component, or by setting the content of the tetracarboxylic dianhydride component to 0.8 to 1.2 molar equivalent per molar equivalent of the diamine compound component.

The quadrivalent organic group φ in the tetracarboxylic dianhydride represented by the general formula (DAH1) may be selected from the group consisting of an aliphatic hydrocarbon group, an alicyclic hydrocarbon group, an aromatic hydrocarbon group, a heterocyclic group each having 1 to 30 carbon atoms and a polycyclic compound group where an aliphatic hydrocarbon group, an alicyclic hydrocarbon group, an aromatic hydrocarbon group or a heterocyclic group is mutually linked to each other directly or via a crosslinking group.

Examples of tetracarboxylic dianhydride represented by the general formula (DAH1) are pyromellitic dianhydride, 3-fluoropyromellitic dianhydride, 3,6-difluoropyromellitic dianhydride, 3-(trifluoromethyl)pyromellitic dianhydride, 3,6-bis(trifluoromethyl)pyromellitic dianhydride, 1,2,3,4-benzenetetracarboxylic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 3,3'',4,4''-terphenyltetracarboxylic dianhydride, 3,3''',4,4'''-quaterphenyltetracarboxylic dianhydride, 3,3'''',4,4''''-quinquephenyltetracarboxylic dianhydride, 2,2',3,3'-biphenyltetracarboxylic dianhydride, methylene-4,4'-diphthalic dianhydride, 1,1-ethylidene-4,4'-diphthalic dianhydride, 2,2-propylidene-4,4'-diphthalic dianhydride, 1,2-ethylene-4,4'-diphthalic dianhydride, 1,3-trimethylene-4,4'-diphthalic dianhydride, 1,4-tetramethylene-4,4'-diphthalic dianhydride, 1,5-pentamethylene-4,4'-diphthalic dianhydride, 1,1,1,3,3,3-hexafluoro-2,2-propylidene-4,4'-diphthalic dianhydride, difluoromethylene-4,4'-diphthalic dianhydride, 1,1,2,2-tetrafluoro-1,2-ethylene-4,4'-diphthalic dianhydride, 1,1,2,2,3,3-hexafluoro-1,3-trimethylene-4,4'-diphthalic dianhydride, 1,1,2,2,3,3,4,4-octafluoro-1,4-tetramethylene-4,4'-diphthalic dianhydride, 1,1,2,2,3,3,4,4,5,5-decafluoro-1,5-pentamethylene-4,4'-diphthalic dianhydride, oxy-4,4'-diphthalic dianhydride, thio-4,4'-diphthalic dianhydride, sulfonyl-4,4'-diphthalic dianhydride, 1,3-bis(3,4-dicarboxyphenyl)-1,1,3,3-tetramethylsiloxane dianhydride, 1,3-bis(3,4-dicarboxyphenyl)benzene dianhydride, 1,4-bis(3,4-dicarboxyphenyl)benzene dianhydride, 1,3-bis(3,4-dicarboxyphenoxy)benzene dianhydride, 1,4-bis(3,4-dicarboxyphenoxy)benzene dianhydride, 1,3-bis[2-(3,4-dicarboxyphenyl)-2-propyl]benzene dianhydride, 1,4-bis[2-(3,4-dicarboxyphenyl)-2-propyl]benzene dianhydride, bis[3-(3,4-dicarboxyphenoxy)phenyl]methane dianhydride, bis[4-(3,4-dicarboxyphenoxy)phenyl]methane dianhydride, 2,2-bis[3-(3,4-dicarboxyphenoxy)phenyl]propane dianhydride, 2,2-bis[4-(3,4-dicarboxyphenoxy)phenyl]propane dianhydride, 2,2-bis[3-(3,4-dicarboxyphenoxy)phenyl]-1,1,1,3,3,3-hexafluoropropane dianhydride, 2,2-bis[4-(3,4-dicarboxyphenoxy)phenyl]-1,1,1,3,3,3-hexafluoropropane dianhydride, bis(3,4-dicarboxyphenoxy)dimethylsilane dianhydride, 1,3-bis(3,4-dicarboxyphenoxy)-1,1,3,3-tetramethyldisiloxane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 1,3-bis(3,4-dicarboxyphenyl)-1,1,3,3-tetramethyldisiloxane dianhydride, ethylenetetracarboxylic dianhydride, cyclopentanetetracarboxylic dianhydride, cyclohexane-1,2,3,4-tetracarboxylic dianhydride, cyclohexane-1,2,4,5-tetracarboxylic dianhydride, 3,3',4,4'-bicyclohexyltetracarboxylic dianhydride, carbonyl-4,4'-bis(cyclohexane-1,2-dicarboxylic) dianhydride, methylene-4,4'-bis(cyclohexane-1,2-dicarboxylic) dianhydride, 1,2-ethylene-4,4'-bis(cyclohexane-1,2-dicarboxylic) dianhydride, 1,1-ethylidene-4,4'-bis(cyclohexane-1,2-dicarboxylic) dianhydride, 2,2-propylidene-4,4'-bis(cyclohexane-1,2-dicarboxylic) dianhydride, 1,1,1,3,3,3-hexafluoro-2,2-propylidene-4,4'-bis(cyclohexane-1,2-dicarboxylic) dianhydride, oxy-4,4'-bis(cyclohexane-1,2-dicarboxylic) dianhydride, thio-4,4'-bis(cyclohexane-1,2-dicarboxylic) dianhydride, sulfonyl-4,4'-bis(cyclohexane-1,2-dicarboxylic) dianhydride, 2,2'-difluoro-3,3',4,4'-biphenyltetracarboxylic dianhydride, 5,5'-difluoro-3,3',4,4'-biphenyltetracarboxylic dianhydride, 6,6'-difluoro-3,3',4,4'-biphenyltetracarboxylic dianhydride, 2,2',5,5',6,6'-hexafluoro-3,3',4,4'-biphenyltetracarboxylic dianhydride, 2,2'-bis(trifluoromethyl)-3,3',4,4'-biphenyltetracarboxylic dianhydride, 5,5'-bis(trifluoromethyl)-3,3',4,4'-biphenyltetracarboxylic dianhydride, 6,6'-bis(trifluoromethyl)-3,3',4,4'-biphenyltetracarboxylic dianhydride, 2,2',5,5'-tetrakis(trifluoromethyl)-3,3',4,4'-biphenyltetracarboxylic dianhydride, 2,2',6,6'-tetrakis(trifluoromethyl)-3,3',4,4'-biphenyltetracarboxylic dianhydride, 5,5',6,6'-tetrakis(trifluoromethyl)-3,3',4,4'-biphenyltetracarboxylic dianhydride, 2,2',5,5',6,6'-hexakis(trifluoromethyl)-3,3',4,4'-biphenyltetracarboxylic dianhydride, 3,3'-difluoro-oxy-4,4'-diphthalic dianhydride, 5,5'-difluoro-oxy-4,4'-diphthalic dianhydride, 6,6'-difluoro-oxy-4,4'-diphthalic dianhydride, 3,3',5,5',6,6'-hexafluoro-oxy-4,4'-diphthalic dianhydride, 3,3'-bis(trifluoromethyl)-oxy-4,4'-diphthalic dianhydride, 5,5'-bis(trifluoromethyl)-oxy-4,4'-diphthalic dianhydride, 6,6'-bis(trifluoromethyl)-oxy-4,4'-diphthalic dianhydride, 3,3',5,5'-tetrakis(trifluoromethyl)-oxy-4,4'-diphthalic dianhydride, 3,3',6,6'-tetrakis(trifluoromethyl)-oxy-4,4'-diphthalic dianhydride, 5,5',6,6'-tetrakis(trifluoromethyl)-oxy-4,4'-diphthalic dianhydride, 3,3',5,5',6,6'-hexakis(trifluoromethyl)-oxy-4,4'-diphthalic dianhydride, 3,3'-difluoro-sufonyl-4,4'-diphthalic dianhydride, 5,5'-difluoro-sufonyl-4,4'-diphthalic dianhydride, 6,6'-difluoro-sufonyl-4,4'-diphthalic dianhydride, 3,3',5,5',6,6'-hexafluoro-sufonyl-4,4'-diphthalic dianhydride, 3,3'-bis(trifluoromethyl)-sufonyl-4, 4'-diphthalic dianhydride, 5,5'-bis(trifluoromethyl)-sufonyl-4,4'-diphthalic dianhydride, 6,6'-bis(trifluoromethyl)-sufonyl-4,4'-diphthalic dianhydride, 3,3',5,5'-tetrakis (trifluoromethyl)-sufonyl-4,4'-diphthalic dianhydride, 3,3', 6,6'-tetrakis(trifluoromethyl)-sufonyl-4,4'-diphthalic dianhydride, 5,5',6,6'-tetrakis(trifluoromethyl)-sufonyl-4,4'-diphthalic dianhydride, 3,3',5,5',6,6'-hexakis (trifluoromethyl)-sufonyl-4,4'-diphthalic dianhydride, 3,3'-difluoro-2,2-perfluoropropylidene-4,4'-diphthalic dianhydride, 5,5'-difluoro-2,2-perfluoropropylidene-4,4'-diphthalic dianhydride, 6,6'-difluoro-2,2-perfluoropropylidene-4,4'-diphthalic dianhydride, 3,3',5,5', 6,6'-hexafluoro-2,2-perfluoropropylidene-4,4'-diphthalic dianhydride, 3,3'-bis(trifluoromethyl)-2,2-perfluoropropylidene-4,4'-diphthalic dianhydride, 5,5'-bis (trifluoromethyl)-2,2-perfluoropropylidene-4,4'-diphthalic dianhydride, 6,6'-bis(trifluoromethyl)-2,2-perfluoropropylidene-4,4'-diphthalic dianhydride, 3,3',5,5'-tetrakis(trifluoromethyl)-2,2-perfluoropropylidene-4,4'-diphthalic dianhydride, 3,3',6,6'-tetrakis(trifluoromethyl)-2, 2-perfluoropropylidene-4,4'-diphthalic dianhydride, 5,5',6, 6'-tetrakis(trifluoromethyl)-2,2-perfluoropropylidene-4,4'-diphthalic dianhydride, 3,3',5,5',6,6'-hexakis (trifluoromethyl)-2,2-perfluoropropylidene-4,4'-diphthalic dianhydride, 9-phenyl-9-(trifluoromethyl)xanthene-2,3,6,7-tetracarboxylic dianhydride, 9,9-bis(trifluoromethyl) xanthene-2,3,6,7-tetracarboxylic dianhydride, and bicyclo [2,2,2]oct-7-ene-2,3,6,7-tetracarboxylic dianhydride.

These tetracarboxylic dianhydrides may be used singly or in combination of two or more kinds. The content of tetracarboxylic dianhydride should be preferably 0.8 molar equivalent or more, more preferably 0.9 molar equivalent (molar fraction) or more based on the total acid anhydride components. The reason for this is that if the content of tetracarboxylic dianhydride is less than this lower limit, the heat resistance of the polyimide resin to be obtained would be deteriorated.

The bivalent organic group φ in the diamine compound represented by the general formula (DA1) may be selected from the group consisting of an aliphatic hydrocarbon group, an alicyclic hydrocarbon group, an aromatic hydrocarbon group, a heterocyclic group each having 1 to 30 carbon atoms and a polycyclic compound group wherein an aliphatic hydrocarbon group, an alicyclic hydrocarbon group, an aromatic hydrocarbon group or a heterocyclic group is mutually linked to each other directly or via a crosslinking group.

Examples of diamine compound represented by the general formula (DA1) are 1,2-phenylenediamine, 1,3-phenylenediamine, 1,4-phenylenediamine, 3,3'-diaminobiphenyl, 3,4'-diaminobiphenyl, 4,4'-diaminobiphenyl, 3,3''-diaminoterphenyl, 4,4''-diaminoterphenyl, 3,3'''-diaminoquaterphenyl, 4,4'''-diaminoquaterphenyl, oxy-3,3'-dianiline, oxy-4,4'-dianiline, thio-3,3'-dianiline, thio-4,4'-dianiline, sulfonyl-3,3'-dianiline, sulfonyl-4,4'-dianiline, methylene-3,3'-dianiline, methylene-4,4'-dianiline, 1,2-ethylene-3,3'-dianiline, 1,2-ethylene-4,4'-dianiline, 2,2-propylidene-3,3'-dianiline, 2,2-propylidene-4,4'-dianiline, 1,1,1,3,3,3-hexafluoro-2,2-propylidene-3,3'-dianiline, 1,1,1,3,3,3-hexafluoro-2,2-propylidene-4,4'-dianiline, 1,1,2,2,3,3-hexafluoro-1,3-propylene-3,3'-dianiline, 1,1,2,2,3,3-hexafluoro-1,3-propylene-4,4'-dianiline, 1,3-bis(3-aminophenoxy)benzene, 1,3-bis(4-aminophenoxy)benzene, 1,3-bis(3-aminophenylthio)benzene, 1,3-bis(4-aminophenylthio) benzene, 1,3-bis(3-aminophenylsulfonyl)benzene, 1,3-bis (4-aminophenylsulfonyl)benzene, 1,3-bis[2-(3-aminophenyl)-2-propyl]benzene, 1,3-bis[2-(4-aminophenyl)-2-propyl]benzene, 1,3-bis[2-(3-aminophenyl)-1,1,1,3,3,3-hexafluoro-2-propyl]benzene, 1,3-bis[2-(4-aminophenyl)-1,1,1,3,3,3-hexafluoro-2-propyl] benzene, 1,4-bis(3-aminophenoxy)benzene, 1,4-bis(4-aminophenoxy)benzene, 1,4-bis(3-aminophenylthio) benzene, 1,4-bis(4-aminophenylthio)benzene, 1,4-bis(3-aminophenylsulfonyl)benzene, 1,4-bis(4-aminophenylsulfonyl)benzene, 1,4-bis[2-(3-aminophenyl)-2-propyl]benzene, 1,4-bis[2-(4-aminophenyl)-2-propyl] benzene, 1,4-bis[2-(3-aminophenyl)-1,1,1,3,3,3-hexafluoro-2-propyl]benzene, 1,4-bis[2-(4-aminophenyl)-1,1,1,3,3,3-hexafluoro-2-propyl]benzene, 2,2-bis[4-(3-aminophenoxy) phenyl]-1,1,1,3,3,3-hexafluoropropane, 2,2-bis[4-(4-aminophenoxy)phenyl]-1,1,1,3,3,3-hexafluoropropane, 5-fluoro-1,3-phenylenediamine, 2-fluoro-1,4-phenylene diamine, 2,5-difluoro-1,4-phenylenediamine, 2,4,5,6-hexafluoro-1,3-phenylenediamine, 2,3,5,6-hexafluoro-1,4-phenylenediamine, 3,3'-diamino-5,5'-difluorobiphenyl, 4,4'-diamino-2,2'-difluorobiphenyl, 4,4'-diamino-3,3'-difluorobiphenyl, 3,3'-diamino-2,2',4,4',5,5',6,6'-octafluorobiphenyl, 4,4'-diamino-2,2',3,3',5,5',6,6'-octafluorobiphenyl, oxy-5,5'-bis(3-fluoroaniline), oxy-4,4'-bis(2-fluoroaniline), oxy-4,4'-bis(3-fluoroaniline), sulfonyl-5,5'-bis(3-fluoroaniline), sulfonyl-4,4'-bis(2-fluoroaniline), sulfonyl-4,4'-bis(3-fluoroaniline), 1,3-bis(3-aminophenoxy)-5-fluorobenzene, 1,3-bis(3-amino-5-fluorophenoxy) benzene, 1,3-bis(3-amino-5-fluorophenoxy)-5-fluorobenzene, 5-(trifluoromethyl)-1,3-phenylenediamine, 2-(trifluoromethyl)-1,4-phenylenediamine, 2,5-bis (trifluoromethyl)-1,4-phenylenediamine, 2,2'-bis (trifluoromethyl)-4,4'-diaminobiphenyl, 3,3'-bis (trifluoromethyl)-4,4'-diaminobiphenyl, oxy-5,5'-bis[3-(trifluoromethyl)aniline], oxy-4,4'-bis[2-(trifluoromethyl) aniline], oxy-4,4'-bis[3-(trifluoromethyl)aniline], sulfonyl-5,5'-bis[3-(trifluoromethyl)aniline], sulfonyl-4,4'-bis[2-(trifluoromethyl)aniline], sulfonyl-4,4'-bis[3-(trifluoromethyl)aniline], 1,3-bis(3-aminophenoxy)-5-(trifluoromethyl)benzene, 1,3-bis[3-amino-5-(trifluoromethyl)phenoxy]benzene, 1,3-bis[3-amino-5-(trifluoromethyl)phenoxy]-5-(trifluoromethyl)benzene, 3,3'-bis(trifluoromethyl)-5,5'-diaminobiphenyl, bis(3-aminophenoxy)dimethylsilane, bis(4-aminophenoxy) dimethylsilane, 1,3-bis(3-aminophenyl)-1,1,3,3-tetramethyldisiloxane, 1,3-bis(4-aminophenyl)-1,1,3,3-tetramethyldisiloxane, methanediamine, 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,2-bis(3-aminopropoxy)ethane, 1,3-diaminocyclohexane, 1,4-diaminocyclohexane, bis(3-aminocyclohexyl)methane, bis(4-aminocyclohexyl) methane, 1,2-bis(3-aminocyclohexyl)ethane, 1,2-bis(4-aminocyclohexyl)ethane, 2,2-bis(3-aminocyclohexyl) propane, 2,2-bis(4-aminocyclohexyl)propane, bis(3-aminocyclohexyl) ether, bis(4-aminocyclohexyl) ether, bis (3-aminocyclohexyl)sulfone, bis(4-aminocyclohexyl) sulfone, 2,2-bis(3-aminocyclohexyl)-1,1,1,3,3,3-hexafluoropropane, 2,2-bis(4-aminocyclohexyl)-1,1,1,3,3,3-hexafluoropropane, 1,3-xylylenediamine, 1,4-xylylenediamine, 1,8-diaminonaphthalene, 2,7-diaminonaphthalene, 2,6-diaminonaphthalene, 2,5-diaminopyridine, 2,6-diaminopyridine, 2,5-diaminopyrazine and 2,4-diamino-s-triazine.

These diamine compounds may be used singly or in combination of two or more kinds. The content of diamine compound should be preferably 0.8 molar equivalent or more, more preferably 0.9 molar equivalent or more based on the total amine compound components. The reason for this is that if the content of diamine compound is less than this lower limit, the heat resistance of the polyimide resin to be obtained would be deteriorated.

Among these tetracarboxylic dianhydride components represented by the aforementioned general formula (DAH1) and these diamine compound components represented by the aforementioned general formula (DA1), the following compounds are particularly preferable as explained below.

Namely, among the tetracarboxylic dianhydride components represented by the aforementioned general formula (DAH1), the following aromatic tetracarboxylic dianhydrides represented by the following general formulas (DAH2), (DAH3) and (DAH4) are particularly preferable:

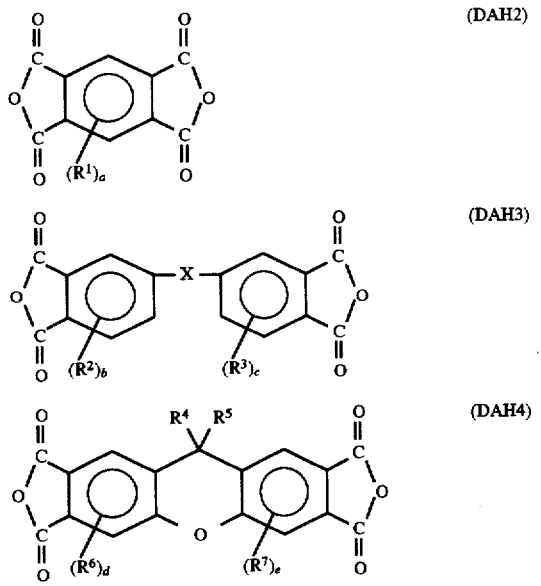

(DAH2)

(DAH3)

(DAH4)

(wherein, in the general formula (DAH2), $R^1$s may be the same or different and are individually fluoro group or unsubstituted or fluorine-substituted aliphatic hydrocarbon group; "a" is an integers ranging from 0 to 2;

in the general formula (DAH3), X is a bivalent oxy group, thio group, sulfonyl group, carbonyl group, peralkylpolysiloxanylene, unsubstituted or fluorine-substituted aliphatic hydrocarbon group, aromatic hydrocarbon group or a single bond; $R^2$ and $R^3$ may be the same or different and are individually fluoro group or unsubstituted or fluorine-substituted aliphatic hydrocarbon group; b and c are integers each ranging from 0 to 3; and in the general formula (DAH4), $R^4$, $R^5$, $R^6$ and $R^7$ may be the same or different and are individually fluoro group or unsubstituted or fluorine-substituted aliphatic hydrocarbon group; d and e are integers each ranging from 0 to 2.)

Examples of aromatic tetracarboxylic dianhydride represented by the general formula (DAH2) are pyromellitic dianhydride, 3-fluoropyromellitic dianhydride, 3,6-difluoropyromellitic dianhydride, 3-(trifluoromethyl) pyromellitic dianhydride and 3,6-bis(trifluoromethyl) pyromellitic dianhydride.

Examples of aromatic tetracarboxylic dianhydride represented by the general formula (DAH3) are 3,3',4,4'-benzophenonetetracarboxylic dianhydride, 3,3',4,4'-biphenyltetracarboxylic dianhydride, methylene-4,4'-diphthalic dianhydride, 1,1-ethylidene-4,4'-diphthalic dianhydride, 2,2-propylidene-4,4'-diphthalic dianhydride, 1,2-ethylene-4,4'-diphthalic dianhydride, 1,3-trimethylene-4,4'-diphthalic dianhydride, 1,4-tetramethylene-4,4'-diphthalic dianhydride, 1,5-pentamethylene-4,4'-diphthalic dianhydride, 3,3",4,4"-terphenyltetracarboxylic dianhydride, 3,3''',4,4'''-quaterphenyltetracarboxylic dianhydride, 3,3"",4,4""-quinquephenyl tetracarboxylic dianhydride, 1,1,1,3,3,3-hexafluoro-2,2-propylidene-4,4'-diphthalic dianhydride, difluoromethylene-4,4'-diphthalic dianhydride, 1,1,2,2-tetrafluoro-1,2-ethylene-4,4'-diphthalic dianhydride, 1,1,2,2,3,3-hexafluoro-1,3-trimethylene-4,4'-diphthalic dianhydride, 1,1,2,2,3,3,4,4-octafluoro-1,4-tetramethylene-4,4'-diphthalic dianhydride, 1,1,2,2,3,3,4,4,5,5-decafluoro-1,5-pentamethylene-4,4'-diphthalic dianhydride, oxy-4,4'-diphthalic dianhydride, thio-4,4'-diphthalic dianhydride, sulfonyl-4,4'-diphthalic dianhydride, 1,3-bis(3,4-dicarboxyphenyl)-1,1,3,3-tetramethylsiloxane dianhydride, 2,2'-difluoro-3,3',4,4'-biphenyltetracarboxylic dianhydride, 5,5'-difluoro-3,3',4,4'-biphenyltetracarboxylic dianhydride, 6,6'-difluoro-3,3',4,4'-biphenyltetracarboxylic dianhydride, 2,2',5,5',6,6'-hexafluoro-3,3',4,4'-biphenyltetracarboxylic dianhydride, 2,2'-bis(trifluoromethyl)-3,3',4,4'-biphenyltetracarboxylic dianhydride, 5,5'-bis(trifluoromethyl)-3,3',4,4'-biphenyltetracarboxylic dianhydride, 6,6'-bis(trifluoromethyl)-3,3',4,4'-biphenyltetracarboxylic dianhydride, 2,2',5,5'-tetrakis(trifluoromethyl)-3,3',4,4'-biphenyltetracarboxylic dianhydride, 2,2',6,6'-tetrakis(trifluoromethyl)-3,3',4,4'-biphenyltetracarboxylic dianhydride, 5,5',6,6'-tetrakis(trifluoromethyl)-3,3',4,4'-biphenyltetracarboxylic dianhydride, 2,2',5,5',6,6'-hexakis(trifluoromethyl)-3,3',4,4'-biphenyltetracarboxylic dianhydride, 3,3'-difluoro-oxy-4,4'-diphthalic dianhydride, 5,5'-difluoro-oxy-4,4'-diphthalic dianhydride, 6,6'-difluoro-oxy-4,4'-diphthalic dianhydride, 3,3',5,5',6,6'-hexafluoro-oxy-4,4'-diphthalic dianhydride, 3,3'-bis(trifluoromethyl)-oxy-4,4'-diphthalic dianhydride, 5,5'-bis(trifluoromethyl)-oxy-4,4'-diphthalic dianhydride, 6,6'-bis(trifluoromethyl)-oxy-4,4'-diphthalic dianhydride, 3,3',5,5'-tetrakis(trifluoromethyl)-oxy-4,4'-diphthalic dianhydride, 3,3',6,6'-tetrakis(trifluoromethyl)-oxy-4,4'-diphthalic dianhydride, 5,5',6,6'-tetrakis(trifluoromethyl)-oxy-4,4'-diphthalic dianhydride, 3,3',5,5',6,6'-hexakis(trifluoromethyl)-oxy-4,4'-diphthalic dianhydride, 3,3'-difluoro-sufonyl-4,4'-diphthalic dianhydride, 5,5'-difluoro-sufonyl-4,4'-diphthalic dianhydride, 6,6'-difluoro-sufonyl-4,4'-diphthalic dianhydride, 3,3',5,5',6,6'-hexafluoro-sufonyl-4,4'-diphthalic dianhydride, 3,3'-bis(trifluoromethyl)-sufonyl-4,4'-diphthalic dianhydride, 5,5'-bis(trifluoromethyl)-sufonyl-4,4'-diphthalic dianhydride, 6,6'-bis(trifluoromethyl)-sufonyl-4,4'-diphthalic dianhydride, 3,3',5,5'-tetrakis(trifluoromethyl)-sufonyl-4,4'-diphthalic dianhydride, 3,3',6,6'-tetrakis(trifluoromethyl)-sufonyl-4,4'-diphthalic dianhydride, 5,5',6,6'-tetrakis(trifluoromethyl)-sufonyl-4,4'-diphthalic dianhydride, 3,3',5,5',6,6'-hexakis(trifluoromethyl)-sufonyl-4,4'-diphthalic dianhydride, 3,3'-difluoro-2,2-perfluoropropylidene-4,4'-diphthalic dianhydride, 5,5'-difluoro-2,2-perfluoropropylidene-4,4'-diphthalic dianhydride, 6,6'-difluoro-2,2-perfluoropropylidene-4,4'-diphthalic dianhydride, 3,3',5,5',6,6'-hexafluoro-2,2-perfluoropropylidene-4,4'-diphthalic dianhydride, 3,3'-bis(trifluoromethyl)-2,2-perfluoropropylidene-4,4'-diphthalic dianhydride, 5,5'-bis(trifluoromethyl)-2,2-perfluoropropylidene-4,4'-diphthalic dianhydride, 6,6'-bis(trifluoromethyl)-2,2-perfluoropropylidene-4,4'-diphthalic dianhydride, 3,3',5,5'-tetrakis(trifluoromethyl)-2,2-perfluoropropylidene-4,4'-diphthalic dianhydride, 3,3',6,6'-tetrakis(trifluoromethyl)-2,2-perfluoropropylidene-4,4'-diphthalic dianhydride, 5,5',6,6'-tetrakis(trifluoromethyl)-2,2-perfluoropropylidene-4,4'- diphthalic dianhydride, and 3,3',5,5',6,6'-hexakis (trifluoromethyl)-2,2-perfluoropropylidene-4,4'-diphthalic dianhydride.

Examples of aromatic tetracarboxylic dianhydride represented by the general formula (DAH4) are 9-phenyl-9-(trifluoromethyl)xanthene-2,3,6,7-tetracarboxylic dianhydride and 9,9-bis(trifluoromethyl)xanthene-2,3,6,7-tetracarboxylic dianhydride.

These aromatic tetracarboxylic dianhydrides may be used singly or in combination of two or more kinds. The employment of the aromatic tetracarboxylic dianhydrides represented by the general formulas (DAH2), (DAH3) or (DAH4) is preferable in that the glass transition point or decomposition temperature of the polyimide to be obtained becomes higher thus exhibiting a higher heat resistance. The content of these aromatic tetracarboxylic dianhydrides should be preferabley 0.8 molar equivalent or more, more preferably 0.9 molar equivalent (molar fraction) or more based on the total acid anhydride components. The reason for this is that if the content of tetracarboxylic dianhydride is less than this lower limit, the heat resistance of the polyimide resin to be obtained would be deteriorated.

Particularly preferable examples among the aromatic tetracarboxylic dianhydrides represented by the general formulas (DAH2), (DAH3) or (DAH4) in viewpoint of heat resistance, environmental stability and low dielectric properties are pyromellitic dianhydride, 3-(trifluoromethyl) pyromellitic dianhydride, 3,6-bis(trifluoromethyl) pyromellitic dianhydride, 3,3',4,4'-benzophenonetetracarboxylic dianhydride, 3,3',4,4'-biphenyltetracarboxylic dianhydride, 3,3',",4,4"-terphenyltetracarboxylic dianhydride, 3,3'",4,4'"-quaterphenyltetracarboxylic dianhydride, 1,1,1,3,3,3-hexafluoro-2,2-propylidene-4,4'-diphthalic dianhydride, oxy-4,4'-diphthalic dianhydride, 2,2-sulfonyl-4,4'-diphthalic dianhydride, 1,3-bis(3,4-dicarboxyphenyl)-1,1,3,3-tetramethylsiloxane dianhydride, 9-phenyl-9-(trifluoromethyl)xanthene-2,3,6,7-tetracarboxylic dianhydride and 9,9-bis(trifluoromethyl)xanthene-2,3,6,7-tetracarboxylic dianhydride.

Among the diamine compound components represented by the aforementioned general formula (DA1), the aromatic diamine compounds represented by the following general formula (DA2) are preferable:

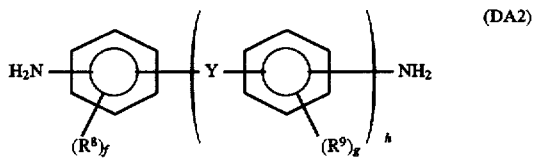

(DA2)

(in this general formula (DA2), Y is a bivalent oxy group, thio group, sulfonyl group, carbonyl group, peralkylpolysiloxanylene, unsubstituted or fluorine-substituted aliphatic hydrocarbon group or a single bond; $R^8$ and $R^9$ may be the same or different and are individually fluoro group or unsubstituted or fluorine-substituted aliphatic hydrocarbon group; f and g are integers each ranging from 0 to 4; and h is an integer ranging from 0 to 6.)

Examples of aromatic diamine compound represented by the general formula (DA2) are 1,2-phenylenediamine, 1,3-phenylenediamine, 1,4-phenylenediamine, 3,3'-diaminobiphenyl, 3,4'-diaminobiphenyl, 4,4'-diaminobiphenyl, 1,3-phenylene-3,3'-dianiline, 1,3-phenylene-4,4'-dianiline, 1,4-phenylene-3,3'-dianiline, 1,4-phenylene-4,4'-dianiline, oxy-3,3'-dianiline, oxy-4,4'-dianiline, thio-3,3'-dianiline, thio-4,4'-dianiline, sulfonyl-3, 3'-dianiline, sulfonyl-4,4'-dianiline, methylene-3,3'-dianiline, methylene-4,4'-dianiline, 1,2-ethylene-3,3'-dianiline, 1,2-ethylene-4,4'-dianiline, 2,2-propylidene-3,3'-dianiline, 2,2-propylidene-4,4'-dianiline, 1,1,1,3,3,3-hexafluoro-2,2-propylidene-3,3'-dianiline, 1,1,1,3,3,3-hexafluoro-2,2-propylidene-4,4'-dianiline, 1,1,2,2,3,3-hexafluoro-1,3-propylene-3,3'-dianiline, 1,1,2,2,3,3-hexafluoro-1,3-propylene-4,4'-dianiline, 1,3-bis(3-aminophenoxy)benzene, 1,3-bis(4-aminophenoxy)benzene, 1,3-bis(3-aminophenylthio)benzene, 1,3-bis(4-aminophenylthio)benzene, 1,3-bis(3-aminophenylsulfonyl) benzene, 1,3-bis(4-aminophenylsulfonyl)benzene, 1,3-bis [2-(3-aminophenyl)-2-propyl]benzene, 1,3-bis[2-(4-aminophenyl)-2-propyl]benzene, 1,3-bis[2-(3-aminophenyl)-1,1,1,3,3,3-hexafluoro-2-propyl]benzene, 1,3-bis[2-(4-aminophenyl)-1,1,1,3,3,3-hexafluoro-2-propyl] benzene, 1,4-bis(3-aminophenoxy)benzene, 1,4-bis(4-aminophenoxy)benzene, 1,4-bis(3-aminophenylthio) benzene, 1,4-bis(4-aminophenylthio)benzene, 1,4-bis(3-aminophenylsulfonyl)benzene, 1,4-bis(4-aminophenylsulfonyl)benzene, 1,4-bis[2-(3-aminophenyl)-2-propyl]benzene, 1,4-bis[2-(4-aminophenyl)-2-propyl] benzene, 1,4-bis[2-(3-aminophenyl)-1,1,1,3,3,3-hexafluoro-2-propyl]benzene, 1,4-bis[2-(4-aminophenyl)-1,1,1,3,3,3-hexafluoro-2-propyl]benzene, 2,2-bis[4-(3-aminophenoxy) phenyl]-1,1,1,3,3,3-hexafluoropropane, 2,2-bis[4-(4-aminophenoxy)phenyl]-1,1,1,3,3,3-hexafluoropropane, 5-fluoro-1,3-phenylenediamine, 2-fluoro-1,4-phenylenediamine, 2,5-difluoro-1,4-phenylenediamine, 2,4, 5,6-hexafluoro-1,3-phenylenediamine, 2,3,5,6-hexafluoro-1,4-phenylenediamine, 3,3'-diamino-5,5'-difluorobiphenyl, 4,4'-diamino-2,2'-difluorobiphenyl, 4,4'-diamino-3,3'-difluorobiphenyl, 3,3'-diamino-2,2',4,4',5,5',6,6'-octafluorobiphenyl, 4,4'-diamino-2,2',3,3',5,5',6,6'-octafluorobiphenyl, oxy-5,5'-bis(3-fluoroaniline), oxy-4,4'-bis(2-fluoroaniline), oxy-4,4'-bis(3-fluoroaniline), sulfonyl-5,5'-bis(3-fluoroaniline), sulfonyl-4,4'-bis(2-fluoroaniline), sulfonyl-4,4'-bis(3-fluoroaniline), 1,3-bis(3-aminophenoxy) -5-fluorobenzene, 1,3-bis(3-amino-5-fluorophenoxy) benzene, 1,3-bis(3-amino-5-fluorophenoxy)-5-fluorobenzene, 5-(trifluoromethyl)-1,3-phenylenediamine, 2-(trifluoromethyl)-1,4-phenylenediamine, 2,5-bis (trifluoromethyl)-1,4-phenylenediamine, 2,2'-bis (trifluoromethyl)-4,4'-diaminobiphenyl, 3,3'-bis (trifluoromethyl)-4,4'-diaminobiphenyl, oxy-5,5'-bis[3-(trifluoromethyl)aniline], oxy-4,4'-bis[2-(trifluoromethyl) aniline], oxy-4,4'-bis[3-(trifluoromethyl)aniline], sulfonyl-5,5'-bis[3-(trifluoromethyl)aniline], sulfonyl-4,4'-bis[2-(trifluoromethyl)aniline], sulfonyl-4,4'-bis[3-(trifluoromethyl)aniline], 1,3-bis(3-aminophenoxy)-5-(trifluoromethyl)benzene, 1,3-bis[3-amino-5-(trifluoromethyl)phenoxy]benzene, 1,3-bis[3-amino-5-(trifluoromethyl)phenoxy]-5-(trifluoromethyl)benzene, 3,3'-bis(trifluoromethyl)-5,5'-diaminobiphenyl, bis(3-aminophenoxy)dimethylsilane, bis(4-aminophenoxy) dimethylsilane, 1,3-bis(3-aminophenyl)-1,1,3,3-tetramethyldisiloxane, and 1,3-bis(4-aminophenyl)-1,1,3,3-tetramethyldisiloxane.

These diamine compounds may be used singly or in combination of two or more kinds. The employment of the aromatic diamine compounds represented by the general formula (DA2) is preferable in that the glass transition point or decomposition temperature of the polyimide to be obtained becomes higher thus exhibiting a higher heat resistance. The content of these aromatic diamine compounds should be preferably 0.8 molar equivalent or more, more preferably 0.9 molar equivalent or more based on the total amine compound components. The reason for this is that if the content of the aromatic diamine compound is less than this lower limit, the heat resistance of the polyimide resin to be obtained would be deteriorated.

Particularly preferable examples among the aromatic diamine compounds represented by the general formula (DA2) in viewpoint of heat resistance, environmental stability and low dielectric properties are 1,3-phenylenediamine, 1,4-phenylenediamine, 3,3'-diaminobiphenyl, 4,4'-diaminobiphenyl, 3,3"-diaminoterphenyl, 4,4"-diaminoterphenyl, 3,3'"-diaminoquaterphenyl, 4,4'"-diaminoquaterphenyl, oxy-3,3'-dianiline, oxy-4,4'-dianiline, sulfonyl-3,3'-dianiline, sulfonyl-4,4'-dianiline, methylene-3,3'-dianiline, methylene-4,4'-dianiline, 2,2-propylidene-3,3'-dianiline, 2,2-propylidene-4,4'-dianiline, 1,1,1,3,3,3-hexafluoro-2,2-propylidene-3,3'-dianiline, 1,1,1,3,3,3-hexafluoro-2,2-propylidene-4,4'-dianiline, 1,3-bis(3-aminophenoxy)benzene, 1,3-bis(4-aminophenoxy)benzene, 1,3-bis[2-(3-aminophenyl)-2-propyl]benzene, 1,3-bis[2-(4-aminophenyl)-2-propyl]benzene, 1,4-bis(3-aminophenoxy)benzene, 1,4-bis(4-aminophenoxy)benzene, 1,4-bis[2-(3-aminophenyl)-2-propyl]benzene, 1,4-bis[2-(4-aminophenyl)-2-propyl]benzene, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, 5-fluoro-1,3-phenylenediamine, 2-fluoro-1,4-phenylenediamine, 2,5-difluoro-1,4-phenylenediamine, 2,4,5,6-hexafluoro-1,3-phenylenediamine, 2,3,5,6-hexafluoro-1,4-phenylenediamine, 3,3'-diamino-5,5'-difluorobiphenyl, 4,4'-diamino-2,2'-difluorobiphenyl, 4,4'-diamino-3,3'-difluorobiphenyl, 3,3'-diamino-2,2',4,4',5,5',6,6'-octafluorobiphenyl, 4,4'-diamino-2,2',3,3',5,5',6,6'-octafluorobiphenyl, 5-(trifluoromethyl)-1,3-phenylenediamine, 2-(trifluoromethyl)-1,4-phenylenediamine, 2,5-bis(trifluoromethyl)-1,4-phenylenediamine, 2,2'-bis(trifluoromethyl)-4,4'-diaminobiphenyl, 3,3'-bis(trifluoromethyl)-4,4'-diaminobiphenyl, oxy-5,5'-bis[3-(trifluoromethyl)aniline], oxy-4,4'-bis[2-(trifluoromethyl)aniline], oxy-4,4'-bis[3-(trifluoromethyl)aniline], sulfonyl-5,5'-bis[3-(trifluoromethyl)aniline], sulfonyl-4,4'-bis[2-(trifluoromethyl)aniline], sulfonyl-4,4'-bis[3-(trifluoromethyl)aniline], 1,3-bis(3-aminophenoxy)-5-(trifluoromethyl)benzene, 1,3-bis[3-amino-5-(trifluoromethyl)phenoxy]benzene, 1,3-bis[3-amino-5-(trifluoromethyl)phenoxy]-5-(trifluoromethyl)benzene, and 3,3'-bis(trifluoromethyl)-5,5'-diaminobiphenyl.

Among these diamine compounds represented by the aforementioned general formula (DA2), particularly preferable compounds are the following aromatic diamine compounds represented by the general formula (DA3) shown below.

$R^{10}$, $R^{11}$ and $R^{12}$ may be the same or different and are individually fluoro group or unsubstituted or fluorine-substituted aliphatic hydrocarbon group; i is a integer ranging from 1 to 6; j is an integer ranging from 0 to 4, k is 0 or 1; and l, m and n are integers each ranging from 0 to 4.).

The aromatic diamine compounds represented by the general formula (DA3) include the following two kinds of aromatic diamine compounds, i.e. (1) an aromatic diamine compound having one benzene ring wherein two amino groups are linked respectively to the meta position of the benzene ring; and (2) an aromatic diamine compound having two or more benzene rings wherein two amino groups are linked respectively to the meta position of a terminal benzene ring (i.e. the meta position as viewed from the bonding site thereof with the neighboring benzene ring).

Examples of aromatic diamine compound represented by the general formula (DA3) and having amino groups at the meta position thereof are 1,3-phenylenediamine, 3,3'-diaminobiphenyl, 1,3-phenylene-3,3'-dianiline, 1,4-phenylene-3,3'-dianiline, oxy-3,3'-dianiline, thio-3,3'-dianiline, sulfonyl-3,3'-dianiline, methylene-3,3'-dianiline, 1,2-ethylene-3,3'-dianiline, 2,2-propylidene-3,3'-dianiline, 1,1,1,3,3,3-hexafluoro-2,2-propylidene-3,3'-dianiline, 1,1,2,2,3,3-hexafluoro-1,3-propylene-3,3'-dianiline, 1,3-bis(3-aminophenoxy)benzene, 1,3-bis(3-aminophenylthio)benzene, 1,3-bis(3-aminophenylsulfonyl)benzene, 1,3-bis[2-(3-aminophenyl)-2-propyl]benzene, 1,3-bis[2-(3-aminophenyl)-1,1,1,3,3,3-hexafluoro-2-propyl]benzene, 1,4-bis(3-aminophenoxy)benzene, 1,4-bis(3-aminophenylthio)benzene, 1,4-bis(3-aminophenylsulfonyl)benzene, 1,4-bis[2-(3-aminophenyl)-2-propyl]benzene, 1,4-bis[2-(3-aminophenyl)-1,1,1,3,3,3-hexafluoro-2-propyl]benzene, 2,2-bis[4-(3-aminophenoxy)phenyl]-1,1,1,3,3,3-hexafluoropropane, 5-fluoro-1,3-phenylenediamine, 2,4,5,6-hexafluoro-1,3-phenylenediamine, 3,3'-diamino-5,5'-difluorobiphenyl, 3,3'-diamino-2,2',4,4',5,5',6,6'-octafluorobiphenyl, oxy-5,5'-bis(3-trifluoroaniline), sulfonyl-5,5'-bis(3-trifluoroaniline), 1,3-bis(3-aminophenoxy)-5-fluorobenzene, 1,3-bis(3-amino-5-fluorophenoxy)benzene, 1,3-bis(3-amino-5-fluorophenoxy)-5-fluorobenzene, 5-(trifluoromethyl)-1,3-phenylenediamine, oxy-5,5'-bis[3-(trifluoromethyl)aniline], sulfonyl-5,5'-bis[3-(trifluoromethyl)aniline], 1,3-bis(3-aminophenoxy)-5-(trifluoromethyl)benzene, 1,3-bis[3-amino-5-(trifluoromethyl)phenoxy]benzene, 1,3-bis[3-amino-5-(trifluoromethyl)phenoxy]-5-(trifluoromethyl)benzene, 3,3'-bis(trifluoromethyl)-5,5'-diaminobiphenyl, bis(3-aminophenoxy)dimethylsilane, and 1,3-bis(3-aminophenyl)-1,1,3,3-tetramethyldisiloxane.

These aromatic diamine compounds represented by the general formula (DA3) may be employed singly or in combination of two or more kinds. When the aromatic diamine compounds represented by the general formula

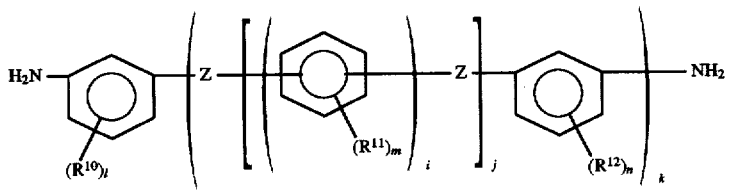

(DA3)

(in this general formula (DA3), Z is a bivalent oxy group, thio group, sulfonyl group, carbonyl group, peralkylpolysiloxanylene, unsubstituted or fluorine-substituted aliphatic hydrocarbon group or a single bond;

(DA3) and having amino groups at the meta position thereof are employed for the formation of polyimide, the resultant polyimide cannot be easily decomposed even if it absorbs moisture as it is left in air atmosphere, and hence it is excellent in environmental stability in particular. The content of these aromatic diamine compounds having amino groups at the meta position thereof should be preferably 0.4 molar equivalent or more, more preferably 0.6 molar equivalent or more based on the total diamine compound components. The reason for this limitation is that if the content of these aromatic diamine compounds having amino groups at the meta position thereof is less than this lower limit, the environmental stability (hygroscopic decomposition resistance) of the polyimide resin to be obtained would be deteriorated.

Particularly preferable examples among the aromatic diamine compounds represented by the general formula (DA3) in viewpoint of heat resistance, environmental stability and low dielectric properties are 1,3-phenylenediamine, 3,3'-diaminobiphenyl, 1,3-phenylene-3,3'-dianiline, 1,4-phenylene-3,3'-dianiline, oxy-3,3'-dianiline, sulfonyl-3,3'-dianiline, 2,2-propylidene-3,3'-dianiline, 1,1,1,3,3,3-hexafluoro-2,2-propylidene-3,3'-dianiline, 1,3-bis(3-aminophenoxy)benzene, 1,4-bis(3-aminophenoxy)benzene, 2,2-bis[4-(3-aminophenoxy)phenyl]-1,1,1,3,3,3-hexafluoropropane, 5-fluoro-1,3-phenylenediamine, 2,4,5,6-hexafluoro-1,3-phenylenediamine, 3,3'-diamino-5,5'-difluorobiphenyl, 3,3'-diamino-2,2',4,4',5,5',6,6'-octafluorobiphenyl, 5-(trifluoromethyl)-1,3-phenylenediamine, oxy-5,5'-bis[3-(trifluoromethyl)aniline], sulfonyl-5,5'-bis[3-(trifluoromethyl)aniline], 1,3-bis(3-aminophenoxy)-5-(trifluoromethyl)benzene, 1,3-bis[3-amino-5-(trifluoromethyl)phenoxy]benzene, 1,3-bis[3-amino-5-(trifluoromethyl)phenoxy]-5-(trifluoromethyl)benzene, and 3,3'-bis(trifluoromethyl)-5,5'-diaminobiphenyl.

These diamine compounds may be used together with a diamine compound represented by the general formula (DA4) shown below, i.e. bis(aminoalkyl)peralkyl polysiloxane compound.

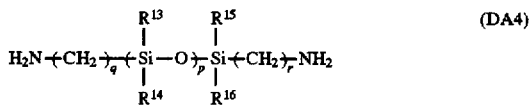

(in this general formula (DA4), $R^{13}$, $R^{14}$, $R^{15}$ and $R^{16}$ may be the same or different and are individually an alkyl group having 1 to 5 carbon atoms; q and r are integers each ranging from 1 to 10; and p is a positive integer).

Specific examples of a bis(aminoalkyl)peralkyl polysiloxane compound represented by the general formula (DA4) are 1,3-bis(aminomethyl)-1,1,3,3-tetramethyldisiloxane, 1,3-bis(2-aminoethyl)-1,1,3,3-tetramethyldisiloxane, 1,3-bis(3-aminopropyl)-1,1,3,3-tetramethyldisiloxane, 1,3-bis(4-aminobutyl)-1,1,3,3-tetramethyldisiloxane, 1,3-bis(5-aminopentyl)-1,1,3,3-tetramethyldisiloxane, 1,3-bis(6-aminohexyl)-1,1,3,3-tetramethyldisiloxane, 1,3-bis(7-aminoheptyl)-1,1,3,3-tetramethyldisiloxane, 1,3-bis(8-aminooctyl)-1,1,3,3-tetramethyldisiloxane, 1,3-bis(10-aminodecyl)-1,1,3,3-tetramethyldisiloxane, 1,5-bis(3-aminopropyl)-1,1,3,3,5,5-hexamethyltrisiloxane, 1,7-bis(3-aminopropyl)-1,1,3,3,5,5,7,7-octamethyltetrasiloxane, 1,11-bis(3-aminopropyl)-1,1,3,3,5,5,7,7,9,9,11,11-dodecamethylhexasiloxane, 1,15-bis(3-aminopropyl)-1,1,3,3,5,5,7,7,9,9,11,11,13,13,15,15-hexadecamethyloctasiloxane, and 1,19-bis(3-aminopropyl)-1,1,3,3,5,5,7,7,9,9,11,11,13,13,15,15,17,17,19,19-eicosamethyldecasiloxane.

The addition of this bis(aminoalkyl)peralkyl polysiloxane compound represented by the general formula (DA4) is advantageous in improving the adhesion or bonding properties of polyimide resin to a glass substrate or a semiconductor substrate such as a silicon substrate. The content of the bis(aminoalkyl)peralkyl polysiloxane compound should preferably be in the range of 0.02 to 0.1 molar equivalent based on the total of diamine components. Because, if the content of the bis(aminoalkyl)peralkyl polysiloxane compound is excessive, the heat resistance of polyimide resin may be deteriorated though the adhesion or bonding properties of the polyimide resin to a substrate may be improved.

The dicarboxylic anyhydride, which may be added, if required, for the purpose of controlling the molecular weight of polyamic acid in the synthesis of the polyamic acid, is represented by the following general formula (AH1).

(in this general formula (AH1), α represents a bivalent organic group)

If this dicarboxylic anhydride which is represented by the general formula (AH1) is to be employed, the mixing ratio of each component should preferably be controlled such that the content of the tetracarboxylic dianhydride represented by the general formula (DAH1) is (1-m/2) molar equivalent (wherein m is 0 to 0.4), the content of the dicarboxylic anhydride represented by the general formula (AH1) is m molar equivalent (wherein m is 0 to 0.4), and the content of the diamine compound represented by the general formula (DA1) is in the range of 0.97 to 1.03 molar equivalent.

The monoamine compound, which may be added, if required, for the purpose of controlling the molecular weight of polyamic acid in the synthesis of the polyamic acid, is represented by the following general formula (MA1).

β-NH₂ (MA1)

(in this general formula (MA1), β represents a monovalent organic group)

If this monoamine compound which is represented by the general formula (MA1) is to be employed, the mixing ratio of each component should preferably be controlled such that the content of the tetracarboxylic dianhydride represented by the general formula (DAH1) is in the range of 0.97 to 1.03 molar equivalent, the content of the diamine compound represented by the general formula (DA1) is (1-n/2) molar equivalent (wherein n is 0 to 0.4), and the content of the monoamine compound represented by the general formula (MA1) is n molar equivalent (wherein n is 0 to 0.4).

As for the method of synthesizing the polyamic acid of this invention, there is not any particular restriction. However, it may be preferable to carry out the polymerization in an organic polar solvent, in an inert gas atmosphere and under a water-free condition.

Examples of such an organic polar solvent which may be employed in this polymerization reaction are N,N-dimethylformamide, N,N-dimethylacetamide, N,N-diethylacetamide, N,N-dimethoxyacetamide, N-methyl-2-pyrrolidinone, 1,3-dimethyl-2-imidazolidinone, N-methylcaprolactam, 1,2-dimethoxyethane, 1,2-diethoxyethane, bis(2-methoxyethyl) ether, bis(2-ethoxyethyl) ether, 1,2-bis(2-methoxyethoxy)ethane, bis[2-(2-methoxyethoxy)ethyl]ether, 1-acetoxy-2-methoxyethane, 1-acetoxy-2-ethoxyethane, (2-acetoxyethyl)(2- methoxyethyl) ether, (2-acetoxyethyl)(2-ethoxyethyl) ether, methyl 3-methoxypropionate, tetrahydrofuran, 1,3-dioxane, 1,3-dioxolane, 1,4-dioxane, pyrroline, pyridine, picoline, dimethylsulfoxide, sulfolane, γ-butyrolactone, propylene carbonate, phenol, cresol, cyclohexanone and acetonylacetone. These organic solvents may be employed singly or in combination of two or more kinds.

The temperature of this polymerization reaction may be generally in the range of −20° to 100° C., preferably in the range of −5° to 30° C. There is any particular limitation with respect to the reaction pressure, and hence the reaction can be performed satisfactorily under the normal pressure. The reaction time depends on the kinds of tetracarboxylic dianhydride and also on the kinds of the solvent to be employed in the reaction. Generally, a time period of 4 to 24 hours may be sufficient for the reaction.

With regard to the inherent viscosity (logarithmic viscosity number) of the polyamic acid to be obtained in this manner, the inherent viscosity of 0.5 wt % solution of the polyamic acid in N-methyl-2-pyrrolidinone at a temperature of 30° C. should be 0.3 (dl/g) or more, preferably in the range of 0.3 (dl/g) to 3 (dl/g). The reason for this limitation is that if the inherent viscosity of the polyamic acid is too low, i.e. if the polymerization degree of the polyamic acid is too low, it is difficult to obtain a polyimide resin having a sufficient heat resistance, whereas if the inherent viscosity of the polyamic acid is too high, i.e. if the polymerization degree of the polyamic acid is too high, the handling of it becomes difficult.

The polyimide film according to this invention can be formed as explained below. First of all, a solution of the aforementioned polyimide precursor composition is coated on the surface to be coated, and then dried by heating if necessary, heated at a temperature of 60° to 400° C., thereby curing the polyimide precursor composition. In the case of forming the polyimide film at a relatively low temperature, the polyimide film can be formed as explained below. First of all, a solution of the aforementioned polyimide precursor composition is coated on the surface of a substrate, dried at a temperature 200° C. or less if necessary, and then heated in air atmosphere or in an inert gas atmosphere at temperature of 100° to 300° C., more preferably 120° to 300° C., most preferably 150° to 250° C. (a direct heating), or heated in two heating steps, i.e. prebaked at a temperature of 60° to 250° C. and then heated at a temperature of 60° to 250° C., preferably 100° to 250° C. under vacuum, thereby curing the polyimide precursor composition. The heating time in this case is dependent on the kind of polyamic acid and cure accelerator, on the heating temperature and on the film thickness coated on the substrate. However, in general, a heating time of 5 minutes to 3 hours may be sufficient for this heating treatment. During this heating treatment, any residual solvent components in the coated film will be evaporated, at the same time, the imidization of the polyamic acid will proceed, thus being transformed into a polyimide structure, and the low temperature cure accelerator is gasified due to the vaporization, sublimation or decomposition thereof, thus forming a polyimide film.

By contrast to the conventional polyamic acid solution which requires a heating temperature of about 300° C. for the curing of the polyamic acid, this invention makes it possible to obtain a polyimide film of excellent quality through a thermal curing at a temperature of as low as 200° C. or less in most cases. By the way, this thermal curing temperature can be suitably set depending on the end-use of the polyimide. For example, in the case of end-use where any residual of the cure accelerator is not desirable, the direct heating temperature or the heating under vacuum may be set at a relatively high temperature, whereas in the case of end-use such as a liquid crystal orienting film where the residual of the cure accelerator would not give any substantial damage to the end-use, the thermal curing may be performed at a relatively low temperature of 160° C. or less.

The polyimide film formed through the curing of the polyimide precursor composition of this invention can be used as an interlayer insulating film between conductive or semiconductive layers, as a passivation film or as a protective film such as a high heat resistance coating film in the manufacture of various kinds of electronic parts, such as a semiconductor element, a high-density printed wiring board, a thin film magnetic head, magnetic bubble memory, a solar cell and a thermal head. Furthermore, since it possible according to this invention to form a polyimide film by making use of a solution of the polyimide precursor composition, the surface of electronic parts can be flattened by forming the polyimide film in subsequent to the formation of the wirings thereon. Additionally, since the curing temperature is low as mentioned above, it is possible to prevent the generation of thermal stress in the electronic parts. Therefore, the polyimide precursor composition of this invention is effective in improving the reliability of electronic parts in addition to its inherent features of excellent heat resistance and low dielectric constant.

The polyimide film to be obtained through a curing of the polyimide precursor composition of this invention is also useful as a liquid crystal orienting film in a liquid crystal element where a pair of transparent substrates each bearing thereon electrodes and a liquid crystal orienting film are superimposed with each other with the liquid crystal orienting films being faced to each other and a liquid crystal is interposed between these transparent substrates. In this case also, since the thermal cure temperature can be set to a low level, it is possible to suppress any deterioration in display properties of the liquid crystal element.

Followings are detailed explanations on specific examples of this invention. However, these examples should not be construed as limiting the present invention.

(1) Synthesis of polyamic acid:

Polyamic acid was synthesized as follows by making use of raw materials mixed together at a predetermined mixing ratio (shown in molar equivalent) as shown in the following Table 1. First of all, 50 ml of N,N-dimethylacetamide was placed under an argon gas atmosphere into a separable flask cooled down to −5° to 5° C. by making use of a cooling medium. Then, a predetermined amount of tetracarboxylic dianhydride was added to the flask and dissolved with stirring to obtain a solution. Subsequently, a predetermined amount of diamine compound was dissolved in 50 ml of N,N-dimethylacetamide to obtain a solution, which was then slowly dripped into the first mentioned solution by means of a dropping funnel provided with a pressure balance tube and stirred for 6 hours to obtain ten kinds of polyamic acid, i.e. PAA1 to PAA10.

Then, the inherent viscosity of a 0.5 wt % solution of each of these polyamic acids in N-methyl-2-pyrrolidinone was measured at a temperature of 30° C., the results being shown in Table 1.

Followings illustrate the codes shown in Table 1 for the tetracarboxylic dianhydrides, diamine compounds and the solvent employed in the examples.

(Tetracarboxylic dianhydride)

PMA: Pyromellitic dianhydride.

6FDPA: 1,1,1,3,3,3-hexafluoro-2,2-propylidene-4,4'-diphthalic dianhydride.

BPTA: 3,3',4,4'-biphenyltetracarboxylic dianhydride.
6FXTA: 9,9-bis(trifluoromethyl)xanthin-2,3,6,7-tetracarboxylic dianhydride.
(Diamine compound)
  ODA: Oxy-4,4'-dianiline.
  mPODA: 1,3-bis(3-aminophenoxy)benzene.
  m6FDA: 1,1,1,3,3,3-hexafluoro-2,2-propylidene-3,3'-dianiline.
  pTFBA: 4,4'-diamino-2,2'-bis(trifluoromethyl)biphenyl.
  mTFBA: 3,3'-diamino-5,5'-bis(trifluoromethyl)biphenyl.
  TSLDA: 1,3-bis(3-aminopropyl)-1,1,1,3,3-tetramethyl disiloxane.
(Solvent)
  DMAC: N,N-dimethylacetamide.

DHA: 3',5'-dihydroxyacetophenone
THA: 2',3',4'-trihydroxyacetophenone
THB: 2,3,4-trihydroxybenzophenone
NRS: 2-nitroresorcinol
HPA: 3,3'-dihydroxydiphenylamine
NDL: 1,6-dihydroxynaphthalene
ATL: 1,4,9,10-tetrahydroxyanthracene
ACD: acridine
PTD: phenanthridsine
BFQ: benzo[f]quinoline
AIM: 1-acetylimidazole
4HQ: 4-hydroxyquinoline
MTR: 2-mercapto-1,2,4-triazole
NMA: N,N-dimethyl nicotinamide

TABLE 1

|  | PAA1 | PAA2 | PAA3 | PAA4 | PAA5 | PAA6 | PAA7 | PAA8 | PAA9 | PAA10 |
|---|---|---|---|---|---|---|---|---|---|---|
| PMA | 1.00 | — | — | — | — | — | — | — | — | — |
| 6FDPA | — | 1.00 | 1.00 | 1.00 | 1.00 | 1.00 | — | — | — | — |
| BPTA | — | — | — | — | — | — | 1.00 | 1.00 | — | — |
| 6FXTA | — | — | — | — | — | — | — | — | 1.00 | 1.00 |
| ODA | 0.95 | 0.95 | — | — | — | — | — | — | — | — |
| mPODA | — | — | 0.95 | — | — | — | — | — | — | — |
| m6FDA | — | — | — | 0.95 | — | — | 0.95 | — | — | — |
| pTFBA | — | — | — | — | 0.95 | — | — | — | 0.95 | — |
| mTFBA | — | — | — | — | — | 0.95 | — | 0.95 | — | 0.95 |
| TSLDA | 0.05 | 0.05 | 0.05 | 0.05 | 0.05 | 0.05 | 0.05 | 0.05 | 0.05 | 0.05 |
| Solvent | DMAC | DMAC | DMAC | DMAC | DMAC | DMAC | DMAC | DMAC | DMAC | DMAC |
| Inherent viscosity [dL/g] | 1.13 | 1.07 | 0.92 | 0.88 | 0.98 | 0.85 | 0.93 | 0.87 | 0.95 | 0.82 |

(2) Synthesis of polyimide precursor composition:

As shown in the following Tables 2 to 11, each of the solution of polyamic acid synthesized in the process as mentioned above was mixed with a cure accelerator at a predetermined mixing ratio (indicated by the value of molar equivalent per molar equivalent of the repeating unit of the polyamic acid) to obtain a polyimide precursor solution (varnish). For the purpose of comparison, samples of polyamic acid solution (varnish) containing no cure accelerator were prepared as shown in Tables 12 and 13.

The codes of the cure accelerators shown in Tables 2 to 11 represent the compounds as illustrated below.
  BIM: benzimidazole
  IMD: imidazole
  TRZ: 1,2,4-triazole
  PRN: purine
  QNL: quinoline
  IQN: isoquinoline
  PTL: phthalazine
  PNT: phenanthroline
  DPY: 4,4'-dipyridyl
  HMP: 4-pyridylmethanol
  3HP: 3-hydroxypyridine
  4HP: 4-hydroxypyridine
  NCA: nicotinamide [3-pyridinecarboxamide]
  INA: isonicotinamide [4-pyridinecarboxamide]
  HQN: 8-hydroxyquinoline
  INX: nicotinaldoxime [4-pyridinecarbaldehyde=oxime]
  BGL: hippuric acid [N-benzoylglycine]
  AGL: N-acetylglycine
  BVR: N-benzoylvaline
  ANA: alininoacetic acid [N-phenylglycine]
  PGN: phloroglucinol
  PGL: pyrogallol
  EGL: ethyl gallate
  PPX: phenyl-2-pyridylketoxime
  HPO: 3-hydroxypyridine-N-oxide
  HQO: 4-hydroxyquinoline-N-oxide (3) The formation of polyimide film and the measurement of the physical properties of the polyimide film:

Then, polyimide films were formed as illustrated below and various physical properties (i.e. imidization ratio, dielectric constant, decomposition-initiating temperature, the quantity of hygroscopically decomposed gas, and liquid crystal orienting property) of the polyimide films were measured, the results being shown in Tables 2 to 13.

Specifically, a solution of each polyimide precursor composition was coated on the surface of a predetermined substrate, and then the coated layer was heated (pre-baking) for 10 minutes on a hot plate heated up to 80° C. Then, resultant layer was thermally cured by making use of any one of the methods (A) to (D) shown below thereby to obtain a sample of polyimide film for measuring the aforementioned physical properties.

(A) The layer was heated for one hour on the hot plate at a temperature of 120° C., and then heated again for one hour in a vacuum oven at a temperature of 100° C.

(B) The layer was heated for 30 minutes on the hot plate at a temperature of 150° C., and then heated again for one hour in a vacuum oven at a temperature of 100° C.

(C) The layer was heated for 30 minutes on the hot plate at a temperature of 160° C.

(D) The layer was heated for one hour on the hot plate attached with a nitrogen cover at a temperature of 150° C. and in a nitrogen atmosphere, then heated again for one hour at a temperature of 250° C., and further heated for one hour at a temperature of 350° C. In this case, the time required for raising the temperature up to the temperature of the next heating step was 30 minutes.

As illustrated above, the temperature condition in the thermal curing was the lowest in the method A, and the temperature condition was raised in the order of the methods B, C and D. These temperature conditions in the thermal curing are indicated in Tables 2 to 13 by these letters A, B, C and D.

The measurements of the physical properties of the resultant polyimide films were performed as follows.

Figure 3:
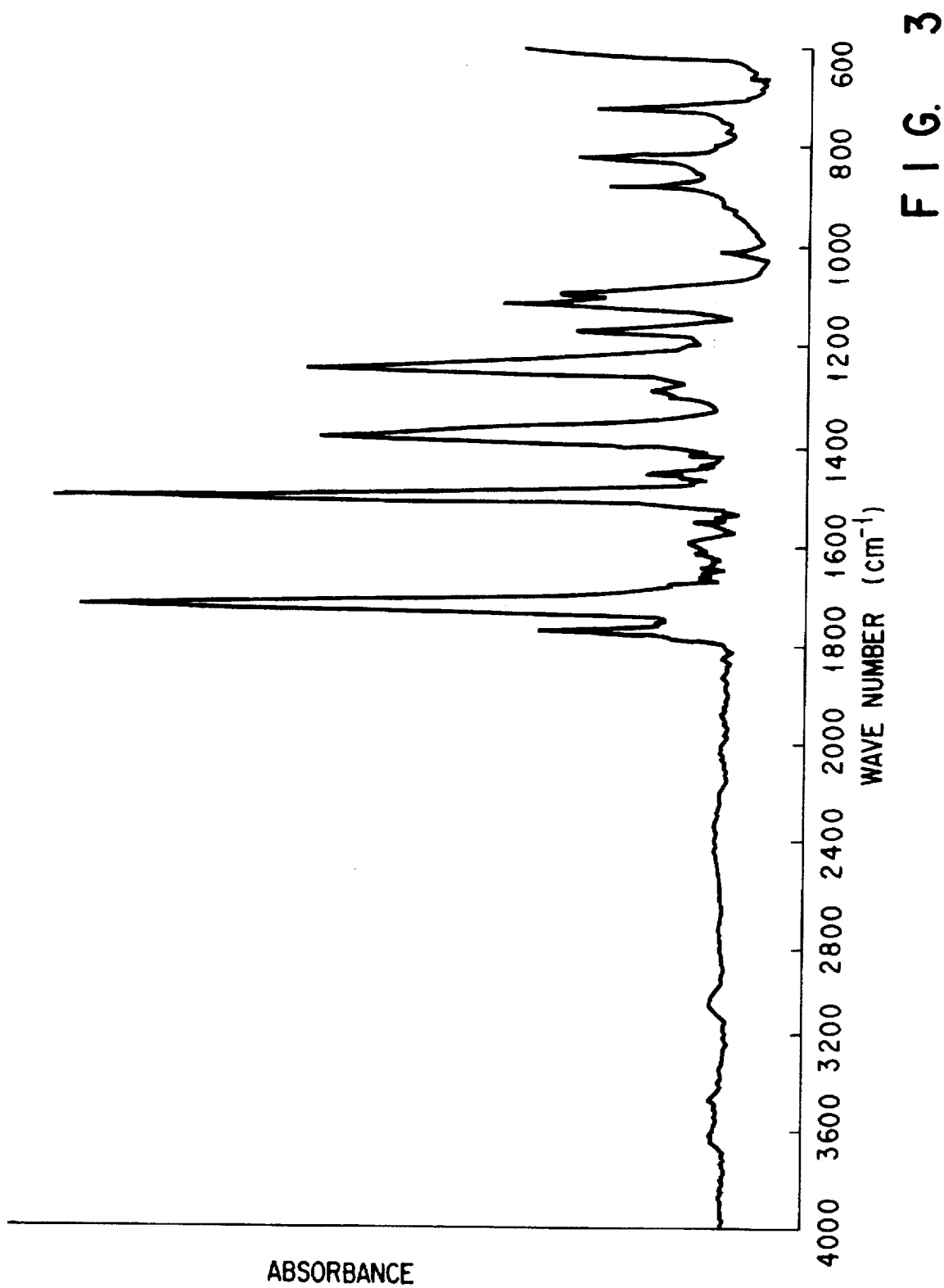
FIG. 3 is a graph showing an IR spectrum of a polyimide film formed in Example 89 of this invention.

(a) IR analysis (measurement of imidization ratio):

A solution of a polyimide precursor composition was coated on a silicon wafer 2 cm square by means of spin coating method to form a layer having such a thickness that would become 1 to 5 μm after curing. Then the resultant layer was prebaked and thermally cured. The polyimide film thus obtained was then measured regarding the IR spectrum thereof. The IR spectrum of each polyimide film which was taken in each of Examples 41, 62 and 89 is shown in each of FIGS. 1 to 3. The imidization ratio was determined by comparing the peaks (belonging to the imide linkage) of the IR spectrums with one another in each group of polyimide films formed from the same polyamic acid. In Tables 2 to 13, the imidization ratios of the polyimide films are indicated by a relative value, i.e. in comparison with the polyimide film which was formed by thermally curing a polyamic acid solution containing nothing of the cure accelerator according to the aforementioned heating process (D) and whose imidization ratio was defined as being 100%.

(b) Measurement of dielectric constant:

A solution of a polyimide precursor composition was coated on an Al plate (1 mm×100 mm×100 mm) by making use of a bar coater to form a layer having such a thickness that would become 40 to 60 μm after curing. Then the resultant layer was prebaked and thermally cured. The polyimide film thus obtained was then measured regarding the dielectric constant thereof at 10 kHz.

(c) TG/DTA analysis (measurement of decomposition-initiating temperature):

A solution of a polyimide precursor composition was coated on a 6-inch silicon wafer by means of spin coating method to form a layer having such a thickness that would become about 10 μm after curing. Then the resultant layer was prebaked and thermally cured. The polyimide film thus obtained was then subjected to a TG/DTA analysis in a nitrogen gas stream to measure the decomposition-initiating temperature (a temperature at which a weight reduction of 0.5% is caused) of the polyimide film.

(d) Pyrolyzer: GC-MASS measurement (measurement on the quantity of hygroscopically decomposed gas):

A solution of a polyimide precursor composition was coated on a 4-inch silicon wafer by means of spin coating method to form a layer having such a thickness that would become about 0.4 to 1 μm after curing. Then the resultant layer was prebaked and thermally cured. Each of the polyimide film thus obtained was then left in a saturated water vapor for one week at a temperature of 20° C. Then, the polyimide film was introduced into a pyrofoil and then heated for 3 seconds at a temperature of 358° C. by means of a Pyrolyzer to allow gas components to be generated from the polyimide film. The gas components thus generated were analyzed by means of GC-MASS. The quantity of toluene gas which is a hydrolyzable gas was evaluated by the reduced value (based on 1 mg of the sample) of peak intensity of the ion chromatography of the MASS.

(e) Liquid crystal orienting property:

A solution of a polyimide precursor composition was coated on a glass substrate bearing thereon screen-printed indium oxide electrodes by means of spin coating method to form a layer having such a thickness that would become about 0.1 μm after curing. Then the resultant layer was prebaked and thermally cured. Each of the polyimide film thus obtained was subjected to an alignment treatment using a rubbing machine provided with a roll covered thereon with a nylon cloth under the conditions of: 450 rpm in revolving speed and 1 cm/sec in stage-moving speed. Then, a couple of substrates each having a liquid crystal orienting film formed by the aforementioned rubbing treatment were superimposed with each other and the peripheries of these substrates were press-bonded with each other by making use of an epoxy-based adhesive containing glass beads (functioning as a spacer). Then, this superimposed body was heated at a temperature of 150° C. to cure the epoxy-based adhesive, thereby manufacture a liquid crystal cell having a cell thickness of 15 μm. Then, a nematic liquid crystal (ZLI-1565, Merk Co.) was poured via a liquid crystal inlet port into the liquid crystal cell, and the inlet port was sealed with a photo-setting epoxy resin. Thereafter, a polarizing plate was superimposed on each of the both outer surfaces of the superimposed body thereby to manufacture a liquid crystal display device for testing. Namely, the initial orienting property of liquid crystal was examined by making use of this liquid crystal display device provided with a liquid crystal orienting film formed from each of polyimide films prepared in the aforementioned examples.

TABLE 2

|  | Example 1 | Example 2 | Example 3 | Example 4 | Example 5 |
| --- | --- | --- | --- | --- | --- |
| Polyamic acid | PAA1 | PAA1 | PAA1 | PAA1 | PAA1 |
| Cure accelerater | BIM | IMD | TRZ | PRN | QNL |
| Molar ratio (to polyamic acid) | 2.0 | 2.0 | 2.0 | 2.0 | 2.0 |
| Thermal curing operation | A | A | A | A | A |
| Imidization ratio | 96% | 95% | 90% | 95% | 88% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | — | — | — | — | — |

|  | Example 6 | Example 7 | Example 8 | Example 9 | Example 10 |
| --- | --- | --- | --- | --- | --- |
| Polyamic acid | PAA1 | PAA1 | PAA1 | PAA1 | PAA1 |
| Cure accelerater | IQN | PTL | PNT | DPY | HMP |
| Molar ratio (to polyamic acid) | 2.0 | 2.0 | 2.0 | 2.0 | 2.0 |
| Thermal curing operation | A | A | A | A | A |
| Imidization ratio | 96% | 90% | 94% | 88% | 92% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | — | — | — | — | — |

TABLE 3

|  | Example 11 | Example 12 | Example 13 | Example 14 | Example 15 |
|---|---|---|---|---|---|
| Polyamic acid | PAA1 | PAA1 | PAA1 | PAA1 | PAA1 |
| Cure accelerater | 3HP | 4HP | NCA | INA | HQN |
| Molar ratio (to polyamic acid) | 2.0 | 2.0 | 2.0 | 2.0 | 2.0 |
| Thermal curing operation | A | A | A | A | A |
| Imidization ratio | 96% | 96% | 96% | 95% | 91% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | — | — | — | — | — |

|  | Example 16 | Example 17 | Example 18 | Example 19 | Example 20 |
|---|---|---|---|---|---|
| Polyamic acid | PAA1 | PAA1 | PAA1 | PAA1 | PAA1 |
| Cure accelerater | INX | BGL | AGL | BVR | ANA |
| Molar ratio (to polyamic acid) | 2.0 | 2.0 | 2.0 | 2.0 | 2.0 |
| Thermal curing operation | A | A | A | A | A |
| Imidization ratio | 89% | 93% | 90% | 92% | 88% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | — | — | — | — | — |

TABLE 4

|  | Example 1 | Example 2 | Example 3 | Example 4 | Example 5 |
|---|---|---|---|---|---|
| Polyamic acid | PAA2 | PAA2 | PAA2 | PAA2 | PAA2 |
| Cure accelerater | BIM | IMD | PRN | IQN | PTL |
| Molar ratio (to polyamic acid) | 2.0 | 2.0 | 2.0 | 2.0 | 2.0 |
| Thermal curing operation | B | B | B | B | B |
| Imidization ratio | 100% | 100% | 100% | 100% | 100% |
| Dielectric constant | 2.90 | 2.90 | 2.90 | 2.90 | 2.90 |
| Decomposition-initiating temperature | 535° C. | 535° C. | 535° C. | 535° C. | 535° C. |
| Peak intensity of hygroscopically decomposed gas | 8.0 × 10² | 8.5 × 10² | 9.0 × 10² | 7.0 × 10² | 7.5 × 10² |
| Liquid crystal orienting property | — | — | — | — | — |

|  | Example 26 | Example 27 | Example 28 | Example 29 | Example 30 |
|---|---|---|---|---|---|
| Polyamic acid | PAA2 | PAA2 | PAA2 | PAA2 | PAA2 |
| Cure accelerater | PNT | 3HP | 4HP | NCA | INA |
| Molar ratio (to polyamic acid) | 2.0 | 2.0 | 2.0 | 2.0 | 2.0 |
| Thermal curing operation | B | B | B | B | B |
| Imidization ratio | 100% | 100% | 100% | 100% | 100% |
| Dielectric constant | 2.90 | 2.90 | 2.90 | 2.90 | 2.90 |
| Decomposition-initiating temperature | 535° C. | 535° C. | 535° C. | 535° C. | 535° C. |
| Peak intensity of hygroscopically decomposed gas | 8.0 × 10² | 8.5 × 10² | 7.5 × 10² | 7.0 × 10² | 8.0 × 10² |
| Liquid crystal orienting property | — | — | — | — | — |

TABLE 5

|  | Example 31 | Example 32 | Example 33 | Example 34 | Example 35 |
|---|---|---|---|---|---|
| Polyamic acid | PAA3 | PAA3 | PAA3 | PAA3 | PAA3 |
| Cure accelerater | BIM | IQN | PTL | 4HP | NCA |
| Molar ratio (to polyamic acid) | 2.0 | 2.0 | 2.0 | 2.0 | 2.0 |
| Thermal curing operation | B | B | B | B | B |
| Imidization ratio | 100% | 100% | 100% | 100% | 100% |
| Dielectric constant | 2.82 | 2.82 | 2.82 | 2.82 | 2.82 |
| Decomposition-initiating temperature | 530° C. | 530° C. | 530° C. | 530° C. | 530° C. |
| Peak intensity of hygroscopically decomposed gas | Not detected | Not detected | Not detected | Not detected | Not detected |
| Liquid crystal orienting property | — | — | — | — | — |

|  | Example 36 | Example 37 | Example 38 | Example 39 | Example 40 |
|---|---|---|---|---|---|
| Polyamic acid | PAA4 | PAA4 | PAA4 | PAA4 | PAA4 |
| Cure accelerater | BIM | IQN | PTL | 411P | NCA |
| Molar ratio (to polyamic acid) | 2.0 | 2.0. | 2.0 | 2.0 | 2.0 |
| Thermal curing operation | B | B | B | B | B |
| Imidization ratio | 100% | 100% | 100% | 100% | 100% |
| Dielectric constant | 2.70 | 2.70 | 2.70 | 2.70 | 2.70 |
| Decomposition-initiating temperature | 530° C. | 530° C. | 530° C. | 530° C. | 530° C. |
| Peak intensity of hygroscopically decomposed gas | Not detected | Not detected | Not detected | Not detected | Not detected |
| Liquid crystal orienting property | — | — | — | — | — |

TABLE 6

|  | Example 41 | Example 42 | Example 43 | Example 44 | Example 45 |
|---|---|---|---|---|---|
| Polyamic acid | PAA5 | PAA5 | PAA5 | PAA5 | PAA5 |
| Cure accelerater | BIM | IQN | PTL | 4HP | NCA |
| Molar ratio (to polyamic acid) | 2.0 | 2.0 | 2.0 | 2.0 | 2.0 |
| Thermal curing operation | B | B | B | B | B |
| Imidization ratio | 100% | 100% | 100% | 100% | 100% |
| Dielectric constant | 2.67 | 2.67 | 2.67 | 2.67 | 2.67 |

TABLE 6-continued

| | | | | | |
|---|---|---|---|---|---|
| Decomposition-initiating temperature | 530° C. | 530° C. | 530° C. | 530° C. | 530° C. |
| Peak intensity of hygroscopically decomposed gas | $1.6 \times 10^3$ | $1.5 \times 10^3$ | $1.6 \times 10^3$ | $1.7 \times 10^3$ | $1.5 \times 10^3$ |
| Liquid crystal orienting property | — | — | — | — | — |

| | Example 46 | Example 47 | Example 48 | Example 49 | Example 50 |
|---|---|---|---|---|---|
| Polyamic acid | PAA6 | PAA6 | PAA6 | PAA6 | PAA6 |
| Cure accelerater | BIM | IQN | PTL | 4HP | NCA |
| Molar ratio (to polyamic acid) | 2.0 | 2.0 | 2.0 | 2.0 | 2.0 |
| Thermal curing operation | B | B | B | B | B |
| Imidization ratio | 100% | 100% | 100% | 100% | 100% |
| Dielectric constant | 2.62 | 2.62 | 2.62 | 2.62 | 2.62 |
| Decomposition-initiating temperature | 540° C. | 540° C. | 540° C. | 540° C. | 540° C. |
| Peak intensity of hygroscopically decomposed gas | Not detected | Not detected | Not detected | Not detected | Not detected |
| Liquid crystal orienting property | — | — | — | — | — |

TABLE 7

| | Example 51 | Example 52 | Example 53 | Example 54 | Example 55 |
|---|---|---|---|---|---|
| Polyamic acid | PAA7 | PAA7 | PAA7 | PAA7 | PAA7 |
| Cure accelerater | BIM | IQN | PTL | 4HP | NCA |
| Molar ratio (to polyamic acid) | 2.0 | 2.0 | 2.0 | 2.0 | 2.0 |
| Thermal curing operation | B | B | B | B | B |
| Imidization ratio | 100% | 100% | 100% | 100% | 100% |
| Dielectric constant | 2.78 | 2.78 | 2.78 | 2.78 | 2.78 |
| Decomposition-initiating temperature | 530° C. | 530° C. | 530° C. | 530° C. | 530° C. |
| Peak intensity of hygroscopically decomposed gas | Not detected | Not detected | Not detected | Not detected | Not detected |
| Liquid crystal orienting property | — | — | — | — | — |

| | Example 56 | Example 57 | Example 58 | Example 59 | Example 60 |
|---|---|---|---|---|---|
| Polyamic acid | PAA8 | PAA8 | PAA8 | PAA8 | PAA8 |
| Cure accelerater | BIM | IQN | PTL | 4HP | NCA |
| Molar ratio (to polyamic acid) | 2.0 | 2.0 | 2.0 | 2.0 | 2.0 |
| Thermal curing operation | B | B | B | B | B |
| Imidization ratio | 100% | 100% | 100% | 100% | 100% |
| Dielectric constant | 2.75 | 2.75 | 2.75 | 2.75 | 2.75 |
| Decomposition-initiating temperature | 540° C. | 540° C. | 540° C. | 540° C. | 540° C. |
| Peak intensity of hygroscopically decomposed gas | Not detected | Not detected | Not detected | Not detected | Not detected |

TABLE 7-continued

| | | | | | |
|---|---|---|---|---|---|
| Liquid crystal orienting property | — | — | — | — | — |

TABLE 8

| | Example 61 | Example 62 | Example 63 | Example 64 | Example 65 |
|---|---|---|---|---|---|
| Polyamic acid | PAA9 | PAA9 | PAA9 | PAA9 | PAA9 |
| Cure accelerater | BIM | IQN | PTL | 4HP | NCA |
| Molar ratio (to polyamic acid) | 2.0 | 2.0 | 2.0 | 2.0 | 2.0 |
| Thermal curing operation | B | B | B | B | B |
| Imidization ratio | 100% | 100% | 100% | 100% | 100% |
| Dielectric constant | 2.70 | 2.70 | 2.70 | 2.70 | 2.70 |
| Decomposition-initiating temperature | 535° C. | 535° C. | 535° C. | 535° C. | 535° C. |
| Peak intensity of hygroscopically decomposed gas | $1.5 \times 10^3$ | $1.3 \times 10^3$ | $1.4 \times 10^3$ | $1.6 \times 10^3$ | $1.5 \times 10^3$ |
| Liquid crystal orienting property | — | — | — | — | — |

| | Example 66 | Example 67 | Example 68 | Example 69 | Example 70 |
|---|---|---|---|---|---|
| Polyamic acid | PAA10 | PAA10 | PAA10 | PAA10 | PAA10 |
| Cure accelerater | BIM | IQN | PTL | 4HP | NCA |
| Molar ratio (to polyamic acid) | 2.0 | 2.0 | 2.0 | 2.0 | 2.0 |
| Thermal curing operation | B | B | B | B | B |
| Imidization ratio | 100% | 100% | 100% | 100% | 100% |
| Dielectric constant | 2.64 | 2.64 | 2.64 | 2.64 | 2.64 |
| Decomposition-initiating temperature | 545° C. | 545° C. | 545° C. | 545° C. | 545° C. |
| Peak intensity of hygroscopically decomposed gas | Not detected | Not detected | Not detected | Not detected | Not detected |
| Liquid crystal orienting property | — | — | — | — | — |

TABLE 9

| | Example 81 | Example 82 | Example 83 | Example 84 | Example 85 |
|---|---|---|---|---|---|
| Polyamic acid | PAA1 | PAA1 | PAA1 | PAA1 | PAA1 |
| Cure accelerater | BIM | IMD | PRN | IQN | PTL |
| Molar ratio (to polyamic acid) | 2.0 | 2.0 | 2.0 | 2.0 | 2.0 |
| Thermal curing operation | C | C | C | C | C |
| Imidization ratio | 100% | 100% | 100% | 100% | 100% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | Excellent | Excellent | Excellent | Excellent | Excellent |

TABLE 9-continued

|  | Example 86 | Example 87 | Example 88 | Example 89 | Example 90 |
|---|---|---|---|---|---|
| Polyamic acid | PAA1 | PAA1 | PAA1 | PAA1 | PAA1 |
| Cure accelerator | PNT | 3HP | 4HP | NCA | INA |
| Molar ratio (to polyamic acid) | 2.0 | 2.0 | 2.0 | 2.0 | 2.0 |
| Thermal curing operation | C | C | C | C | C |
| Imidization ratio | 100% | 100% | 100% | 100% | 100% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | Excellent | Excellent | Excellent | Excellent | Excellent |

TABLE 10

|  | Example 91 | Example 92 | Example 93 | Example 94 | Example 95 |
|---|---|---|---|---|---|
| Polyamic acid | PAA1 | PAA1 | PAA1 | PAA1 | PAA1 |
| Cure accelerator | PGN | PGL | EGL | DHA | THA |
| Molar ratio (to polyamic acid) | 2.0 | 2.0 | 2.0 | 2.0 | 2.0 |
| Thermal curing operation | A | A | A | A | A |
| Imidization ratio | 95% | 93% | 95% | 93% | 90% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | — | — | — | — | — |

|  | Example 96 | Example 97 | Example 98 | Example 99 | Example 100 |
|---|---|---|---|---|---|
| Polyamic acid | PAA1 | PAA1 | PAA1 | PAA1 | PAA1 |
| Cure accelerator | THB | NRS | HPA | NDL | ATL |
| Molar ratio (to polyamic acid) | 2.0 | 2.0 | 2.0 | 2.0 | 2.0 |
| Thermal curing operation | A | A | A | A | A |
| Imidization ratio | 94% | 91% | 94% | 92% | 90% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | — | — | — | — | — |

TABLE 11

|  | Example 101 | Example 102 | Example 103 | Example 104 | Example 105 |
|---|---|---|---|---|---|
| Polyamic acid | PAA1 | PAA1 | PAA1 | PAA1 | PAA1 |
| Cure accelerator | ACD | PTD | BFQ | AIM | 4HQ |
| Molar ratio (to polyamic acid) | 2.0 | 2.0 | 2.0 | 2.0 | 2.0 |
| Thermal curing operation | A | A | A | A | A |
| Imidization ratio | 88% | 92% | 90% | 93% | 96% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | — | — | — | — | — |

|  | Example 106 | Example 107 | Example 108 | Example 109 | Example 110 |
|---|---|---|---|---|---|
| Polyamic acid | PAA1 | PAA1 | PAA1 | PAA1 | PAA1 |
| Cure accelerator | MTR | NMA | PPX | HPO | HQO |
| Molar ratio (to polyamic acid) | 2.0 | 2.0 | 2.0 | 2.0 | 2.0 |
| Thermal curing operation | A | A | A | A | A |
| Imidization ratio | 88% | 93% | 92% | 90% | 93% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | — | — | — | — | — |

TABLE 12

|  | Comparative Example 1 | Comparative Example 2 | Comparative Example 3 | Comparative Example 4 | Comparative Example 5 |
|---|---|---|---|---|---|
| Polyamic acid | PAA1 | PAA2 | PAA3 | PAA4 | PAA5 |
| Cure accelerator | None | None | None | None | None |
| Molar ratio (to polyamic acid) | — | — | — | — | — |
| Thermal curing operation | A | B | B | B | B |
| Imidization ratio | 0% | 10% | 18% | 11% | 8% |
| Dielectric constant | — | — | — | — | — |
| Decomposition-initiating temperature | — | — | — | — | — |
| Peak intensity of hygroscopically decomposed gas | — | — | — | — | — |
| Liquid | — | — | — | — | — |

TABLE 12-continued crystal orienting property

|  | Comparative Example 6 | Comparative Example 7 | Comparative Example 8 | Comparative Example 9 | Comparative Example 10 |
|---|---|---|---|---|---|
| Polyamic acid | PAA6 | PAA7 | PAA8 | PAA9 | PAA10 |
| Cure accelerater | None | None | None | None | None |
| Molar ratio (to polyamic acid) | — | — | — | — | — |
| Thermal curing operation | B | B | B | B | B |
| Imidization ratio | 12% | 12% | 14% | 10% | 14% |
| Dielectric constant | — | — | — | — | — |
| Decomposition-initiating temperature | — | — | — | — | — |
| Peak intensity of hygroscopically decomposed gas | — | — | — | — | — |
| Liquid crystal orienting property | — | — | — | — | — |

TABLE 13

|  | Comparative Example 11 | Comparative Example 12 | Comparative Example 13 | Comparative Example 14 | Comparative Example 15 |
|---|---|---|---|---|---|
| Polyamic acid | PAA2 | PAA3 | PAA4 | PAA5 | PAA6 |
| Cure accelerater | None | None | None | None | None |
| Molar ratio (to polyamic acid) | — | — | — | — | — |
| Thermal curing operation | D | D | D | D | D |
| Imidization ratio | 100% | 100% | 100% | 100% | 100% |
| Dielectric constant | 2.90 | 2.82 | 2.70 | 2.67 | 2.62 |
| Decomposition-initiating temperature | 535° C. | 530° C. | 530° C. | 530° C. | 540° C. |
| Peak intensity of hygroscopically decomposed gas | $1.6 \times 10^4$ | $1.4 \times 10^3$ | $1.9 \times 10^3$ | $3.3 \times 10^4$ | $1.0 \times 10^3$ |
| Liquid crystal orienting property | — | — | — | — | — |

TABLE 13-continued

|  | Comparative Example 16 | Comparative Example 17 | Comparative Example 18 | Comparative Example 19 | Comparative Example 20 |
|---|---|---|---|---|---|
| Polyamic acid | PAA7 | PAA8 | PAA9 | PAA10 | PAA1 |
| Cure accelerater | None | None | None | None | None |
| Molar ratio (to polyamic acid) | — | — | — | — | — |
| Thermal curing operation | D | D | D | D | C |
| Imidization ratio | 100% | 100% | 100% | 100% | 24% |
| Dielectric constant | 2.78 | 2.75 | 2.70 | 2.64 | — |
| Decomposition-initiating temperature | 530° C. | 540° C. | 535° C. | 545° C. | — |
| Peak intensity of hygroscopically decomposed gas | $1.8 \times 10^3$ | $1.0 \times 10^3$ | $3.0 \times 10^4$ | $1.2 \times 10^3$ | — |
| Liquid crystal orienting property | — | — | — | — | — |

It will be clear from the comparison of physical properties shown in Tables 2 to 13 by taking the thermal curing conditions into account that the polyimide precursor compositions of this invention can be sufficiently cured at a relatively low temperature and the polyimide films prepared from the polyimide precursor compositions of this invention are excellent in physical properties.

The followings are specific evaluations on each of these properties.

(a) Evaluation on the imidization ratio:

The following facts will be clearly understood from the comparison on the imidization ratios shown in Tables 2 to 13. Namely, as for the imidization ratio of the polyamic acid solution of Comparative Examples which contain nothing of a cure accelerator, it was approximately 0% in the sample (Comparative Example 1) which was treated by means of "A" process (curing temperature: 120° C.); 8 to 18% in samples (Comparative Examples 2 to 19) which were treated by means of "B" process (curing temperature: 150° C.); and 24% in the sample (Comparative Example 20) which was treated by means of "C" process (curing temperature: 160° C.). By contrast, when the polyimide precursor compositions of this invention were employed, it was approximately 88 to 96% even in the samples (Examples 1 to 20 and 91 to 110) which were treated by means of "A" process (curing temperature: 120° C.; and almost 100% in the samples (Examples 21 to 80, and 81 to 90) which were treated by means of "B" process (curing temperature: 150° C.) or by means of "C" process (curing temperature: 160° C.). As illustrated above, the polyimide precursor composition of this invention is excellent in low temperature curing property.

(b) Evaluation on the dielectric constant:

The following facts will be clearly understood from the comparison of the dielectric constants shown in Tables 4 to 8 with the dielectric constants shown in Table 13. Namely, the polyimide films of Examples 31 to 80 which were treat ed by means of "B" process (curing temperature: 150° C.) indicated almost the same degree of dielectric constant as that of the polyimide films of Comparative Examples 11 to 19 which were treated by means of "D" process employing a high curing temperature condition. It will be clear from this fact that it is possible with the employment of the solution of is possible precursor composition of this invention to obtain a polyimide film having a low dielectric constant even if it is cured at relatively low temperatures.

(c) Evaluation on the decomposition-initiating point:

The following facts will be clearly understood from the comparison of the decomposition-initiating points shown in Tables 4 to 8 with the decomposition-initiating points shown in Table 13. Namely, the polyimide films of Examples 31 to 80 which were treated by means of "B" process (curing temperature: 150° C.) indicated almost the same degree of decomposition-initiating point as that of the polyimide films of Comparative Examples 11 to 19 which were treated by means of "D" process employing a high curing temperature condition. It will be clear from this fact that it is possible with the employment of the solution of polyimide precursor composition of this invention to obtain a polyimide film having an excellent heat resistance even if it is cured at relatively low temperatures.

(d) Evaluation on the quantity of decomposed gases:

The following facts will be clearly understood from the comparison of the quantity of decomposed gases (the peak intensity of decomposed gases) shown in Tables 4 to 8 with the quantity of decomposed gases shown in Table 13. Namely, most of the polyimide films of Examples 31 to 80 indicated a very small quantity in generation of toluene gas in spite of the fact that they were treated by means of "B" process (curing temperature: 150° C.). For example, the quantity of toluene gas generated in these Examples was smaller than that of the polyimide films of Comparative Examples 11 to 19 which contained the same kinds of polyamic acid as those of Examples 31 to 80 and were treated by means of "D" process employing a high curing temperature condition. It will be clear from this fact that the polyimide film formed by curing the polyimide precursor composition of this invention at a low temperature generates a small amount of decomposed gas, and excellent in hygroscopic decomposition resistance (environmental stability).

(e) Evaluation on the liquid crystal orienting property:

It will be clear from the comparison of the liquid crystal orienting property shown in Table 9 to that shown in Table 13 that the sample of Comparative Example 20 was poor in liquid crystal orientation, whereas the samples in Examples 81 to 90 indicated an excellent liquid crystal orientation. Since the liquid crystal display device samples offered to this evaluation of liquid crystal orienting property were all provided with polyimide liquid crystal orienting films heat-treated according to the "C" process, this difference in liquid crystal orienting property was assumed to have been brought about by the difference in imidization ratio.

Additionally, various kinds of electronic parts and liquid crystal display elements were fabricated as shown in FIGS. 4 to 8 by making use of polyimide films which were obtained from the curing of the polyimide precursor compositions of this invention.

FIG. 4 illustrates a cross-sectional view showing a semiconductor element having a multilayered wiring structure provided with an interlayer insulation film which was formed by making use of a polyimide film of this invention. In this case, the polyimide film which was obtained from the curing of the polyimide precursor composition of Example 46 according to "B" process was employed for forming the interlayer insulation film.

Referring to FIG. 4, a thermal oxide film 12 is formed on the surface of a silicon substrate (wafer) 11 having an element region 17. A contact hole is formed at a portion of this thermal oxide film 12, and a first Al wiring 13 is formed over the contact hole. An interlayer insulation film 14 consisting of a polyimide film is superimposed on this first Al wiring 13. Furthermore, another contact hole is formed at a portion of the interlayer insulation film 14, and a second Al wiring 15 connected to the first Al wiring 13 is formed over the latter contact hole. On this second Al wiring 15 is further superimposed another interlayer insulation film 16.

Since the interlayer insulation film 14 is formed through a curing of a spin-coated layer of a solution of polyimide precursor composition, the step to be formed in this process can be greatly minimized, thus making it possible to form multi-layered Al wirings while maintaining the flatness of surface of the device and to obtain a highly reliable wiring structure. It is possible to form a polyimide film exhibiting a low thermal expansion by making use of the polyimide precursor composition of this invention if the monomer for the polyimide precursor composition is suitably selected. Moreover, since the polyimide precursor composition is cured through a low temperature curing process, it is possible to form a polyimide film at a temperature zone where the thermal expansion of the film can be minimized. Therefore, any thermal stress to a semiconductor element can be minimized so that the generation of cracks in the semiconductor element can be suppressed even if the semiconductor element is subjected to a heat cycle.

FIG. 5 illustrates a cross-sectional view of a semiconductor device provided with a passivation film which was formed by making use of a polyimide film of this invention. In this case, the polyimide film which was obtained from the curing of the polyimide precursor composition of Example 54 according to "B" process was employed for forming the passivation film.

Reffering to FIG. 5, bonding pads 22 are formed on a LSI chip 21 located on a tab 23, and a passivation film 25 consisting of a patterned polyimide film covers the chip and pads. The bonding pad 22 is connected to a leadframe 27 with a bonding wire 26, and this structure is encapsulated with a sealing material 28.

If a passivation film 25 consisting of a polyimide film formed from a polyimide precursor composition of this invention is employed in the manufacture of a semiconductor element, it is possible to obtain a semiconductor element which is excellent in reliability while substantially preventing any defective product from being produced in the manufacturing steps.

FIG. 6 illustrates a cross-sectional view of a thin film magnetic head provided with an interlayer insulating film which was formed by making use of a polyimide film of this invention. In this case, the polyimide film which was obtained from the curing of the polyimide precursor composition of Example 38 according to "B" process was employed for forming the interlayer insulating film.

Referring to FIG. 6, a lower magnetic layer 32 and a gap alumina layer 33 are successively deposited on a lower alumina layer 31 formed on the surface of an altic substrate 30. On this gap alumina layer 33 are disposed a first conductive coil 35 and a second conductive coil 36, each being separately buried in an interlayer insulating film 34 made of a polyimide film so as to be insulated from each other. An upper magnetic layer 37 is formed as an uppermost layer, and the peripheral portion of the magnetic head is constructed such that the gap alumina 33 is sandwiched between the lower magnetic layer 32 and the upper magnetic layer 37.

Since the interlayer insulation film 34 is formed through a curing of a spin-coated layer of a solution of polyimide precursor composition, the steps to be formed by the first conductive coil 35 and the second conductive coil 36 can be minimized. Further, since the steps are already minimized as mentioned above, the quantity of layer to be etched by an etch-back process for flattening the interlayer insulation film 34 can be reduced to about one half as compared with the conventional method, thus making it possible to shorten the manufacturing process and at the same time to improve the accuracy in film thickness of the interlayer insulation film 34.

Figure 7:
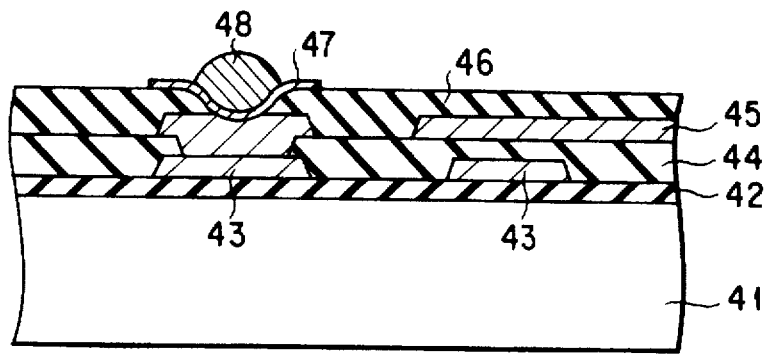
FIG. 7 is a cross-sectional view of a multi-chip module provided with an interlayer insulating film formed of a polyimide film according to this invention.

FIG. 7 is a cross-sectional view illustrating a multi-chip module provided with an interlayer insulation film which was formed by making use of a polyimide film obtained according to this invention. In this case, the polyimide film which was obtained from the curing of the polyimide precursor composition of Example 32 according to "B" process was employed for forming the interlayer insulating film.

Referring to FIG. 7, a thermal oxide film 42 is formed on the surface of a silicon substrate 41. On this thermal oxide film 42, a copper wiring 43, an interlayer insulation film 44 consisting of a polyimide film, another copper wiring 45 and another interlayer insulation film 46 consisting of a polyimide film are successively superimposed. Furthermore, a contact hole is formed at a portion of the upper interlayer insulation film 46. A Pb/Sn electrode 47 connected to the copper wiring 43 and BLM (Ball Limiting Metallization) 48 are also formed in this contact hole.

Since the interlayer insulation film 44 is formed through a curing of a spin-coated layer of a solution of polyimide precursor composition, the step to be formed due to the presence of the copper wiring can be greatly minimized, thus making it possible to flatten the surface of the device and to obtain a highly reliable wiring structure.

Figure 8:
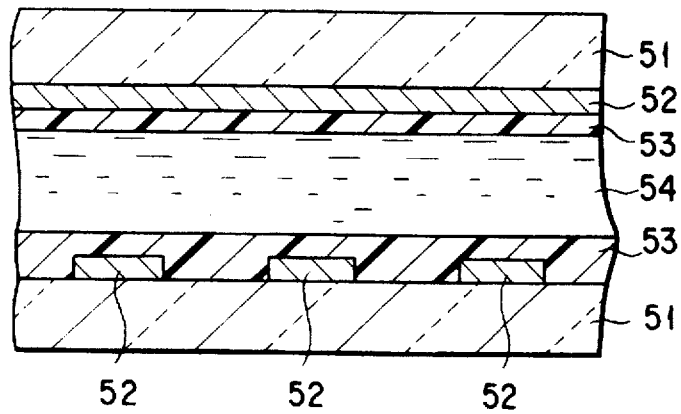
FIG. 8 is a cross-sectional view of a liquid crystal display element provided with a liquid crystal alignment film formed of a polyimide film according to this invention.

FIG. 8 is a cross-sectional view illustrating a liquid crystal display element provided with a liquid crystal orienting film which was formed by making use of a polyimide film obtained according to this invention. In this case, the polyimide film which was obtained from the curing of the polyimide precursor composition of Example 89 according to "C" process was employed for forming the liquid crystal orienting film.

Referring to FIG. 8, a plurality of transparent electrodes 52 and a liquid crystal orienting film 53 formed of polyimide and having a thickness of 20 to 200 nm are formed on each surface of a couple of glass substrates 51. Then, after the liquid crystal orienting films 53 have been subjected to a rubbing treatment in the conventional manner, this couple of glass substrates 51 are superimposed with each other in such a manner that the liquid crystal orienting films 53 faces to each other with a predetermined space being kept therebetween. Then, a liquid crystal is poured into the space formed between these glass substrates, thereby forming a liquid crystal cell.

It is possible with the employment of the polyimide precursor composition of this invention to obtain the liquid crystal orienting films 53 exhibiting a high imidization ratio by curing the polyimide precursor composition at a lower temperature (100° to 200° C.) as compared with the curing temperature (300° C. or more) of the conventional polyimide precursor composition, taking a curing time of 0.5 to 2 hours, which is shorter than that required for curing the conventional polyimide precursor composition. Therefore, it is possible according to this invention to prevent the problem of deteriorating the display property of liquid crystal display device that may be resulted from the heat treatment at a high temperature.

As explained above, the polyimide precursor composition of this invention can be imidated at a temperature of as low as 100° to 200° C., and the resultant polyimide film to be obtained from the curing of this polyimide precursor composition is low in dielectric constant and hygroscopicity, and excellent in heat resistance and environmental stability (hygroscopic decomposition resistance). It is also possible, with the employment of the polyimide precursor composition of this invention, to provide a highly reliable electronic parts or liquid crystal element having, on its silicon substrate or a glass substrate, an insulating film, a passivation film or a liquid crystal orienting film each formed of a polyimide film which is excellent in dielectric property, humidity resistance and environmental stability, thereby making it possible to achieve a high speed operation and power saving.

Therefore, the polyimide precursor composition of this invention is useful as a carrier film for an IC or LSI; as a wiring-insulating film for a flat cable, flexible printed wiring board or LSI; as a moisture resistant protective film for an LSI; as an α-ray shielding film; as a passivation film for a semiconductor element; as an insulating film for a metal-cored printed wiring board; as an interlayer insulating film for a thin film magnetic head; as an interlayer insulating film for a magnetic bubble memory; as a high heat resistant coating film for a glass cloth laminate or thermal head; and as a liquid crystal orienting film for a liquid crystal display element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A polyimide precursor composition, which comprises;
   a polyamic acid having a repeating unit represented by the following general formula (PA); and
   at least one cure accelerator selected from the group consisting of a substituted or unsubstituted nitrogen-containing heterocyclic compound exhibiting an acid dissociation index "pKa" of a proton complex ranging from 0 to 8 in an aqueous solution thereof, or an N-oxide compound of said nitrogen-containing heterocyclic compound (AC1), a substituted or unsubstituted amino acid compound (AC2), and an aromatic hydrocarbon compound or an aromatic heterocyclic compound having a molecular weight of 1,000 or less and two or more hydroxyl groups (AC3):

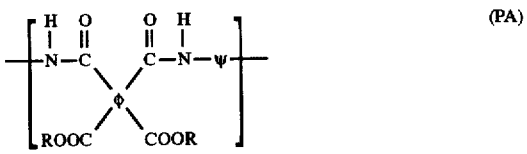

wherein φ is a quadrivalent organic group; φ is a bivalent organic group; R is a substituted or unsubstituted hydrocarbon group, organosilicic group or hydrogen atom.

2. The polyimide precursor composition according to claim 1, wherein said polyamic acid represented by the general formula (PA) is a compound which is obtained from a polymerization of a mixture comprising (1-m/2) molar equivalent (wherein m is 0 to 0.4) of a tetracarboxylic dianhydride represented by the following general formula (DAH1), 0.97 to 1.03 molar equivalent of a diamine compound represented by the following general formula (DA1), and m molar equivalent (wherein m is 0 to 0.4) of a dicarboxylic anhydride represented by the following general formula (AH1) at a temperature ranging from −20° to 100° C. in an organic polar solvent, in an inert gas atmosphere and under a condition which is free from water

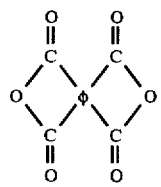   (DAH1)

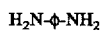   (DA1)

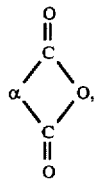   (AH1)

(in the general formula (DAH1), φ represents a quadrivalent organic group; in the general formula (DA1), φ represents a bivalent organic group; and in the general formula (AH1), α represents a bivalent organic group).

3. The polyimide precursor composition according to claim 2, wherein said tetracarboxylic dianhydride represented by the general formula (DAH1) is at least one compound selected from the group consisting of compounds represented by the following general formulas (DAH2), (DAH3) and (DAH4):

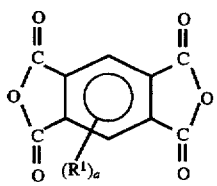   (DAH2)

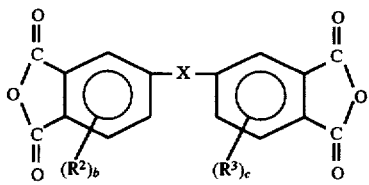   (DAH3)

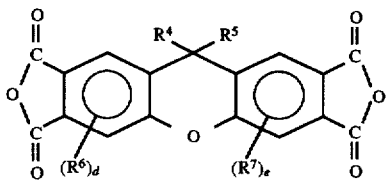   (DAH4)

(in the general formula (DAH2), $R^1$s may be the same or different and are individually fluoro group or unsubstituted or fluorine-substituted aliphatic hydrocarbon group; "a" is an integers ranging from 0 to 2;

in the general formula (DAH3), X is a bivalent oxy group, thio group, sulfonyl group, carbonyl group, peralkylpolysiloxanylene, unsubstituted or fluorine-substituted aliphatic hydrocarbon group, aromatic hydrocarbon group or a single bond; $R^2$ and $R^3$ may be the same or different and are individually fluoro group or unsubstituted or fluorine-substituted aliphatic hydrocarbon group; b and c are integers each ranging from 0 to 3; and in the general formula (DAH4), $R^4$, $R^5$, $R^6$ and $R^7$ may be the same or different and are individually fluoro group or unsubstituted or fluorine-substituted aliphatic hydrocarbon group; d and e are integers each ranging from 0 to 2).

4. The polyimide precursor composition according to claim 2, wherein said diamine compound contains 0.8 molar equivalent or more of a compound represented by the following general formula (DA2):

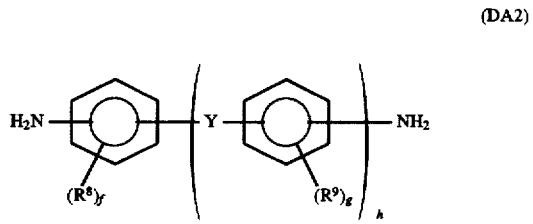   (DA2)

(in this general formula (DA2), Y is a bivalent oxy group, thio group, sulfonyl group, carbonyl group, peralkylpolysiloxanylene, unsubstituted or fluorine-substituted aliphatic hydrocarbon group or a single bond; $R^8$ and $R^9$ may be the same or different and are individually fluoro group or unsubstituted or fluorine-substituted aliphatic hydrocarbon group; f and g are integers each ranging from 0 to 4; and h is an integer ranging from 0 to 6).

5. The polyimide precursor composition according to claim 4, wherein said diamine compound represented by the general formula (DA2) contains 0.4 molar equivalent or more of an aromatic diamine compounds represented by the general formula (DA3) shown below

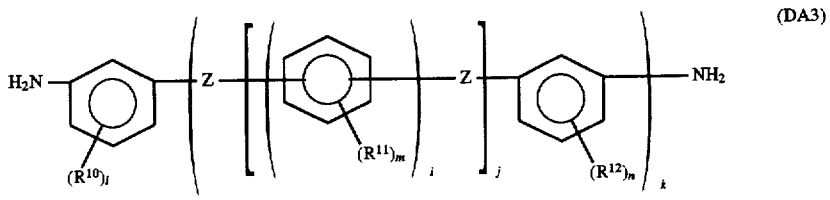

(in this general formula (DA3), Z is a bivalent oxy group, thio group, sulfonyl group, carbonyl group, peralkylpolysiloxanylene, unsubstituted or fluorine-substituted aliphatic hydrocarbon group or a single bond; $R^{10}$, $R^{11}$ and $R^{12}$ may be the same or different and are individually fluoro group or unsubstituted or fluorine-substituted aliphatic hydrocarbon group; i is a integer ranging from 1 to 6; j is an integer ranging from 0 to 4, k is 0 or 1; and l, m and n are integers each ranging from 0 to 4).

6. The polyimide precursor composition according to claim 1, wherein said polyamic acid represented by the general formula (PA) is a compound which is obtained from a polymerization of a mixture comprising 0.97 to 1.03 molar equivalent of a tetracarboxylic dianhydride represented by the following general formula (DAH1), (1-n/2) molar equivalent (wherein n is 0 to 0.4) of a diamine compound represented by the following general formula (DA1) and n molar equivalent (wherein n is 0 to 0.4) of a diamine component represented by the following general formula (MA1), at a temperature ranging from −20° to 100° C. in an organic polar solvent, in an inert gas atmosphere and under a condition which is free from water

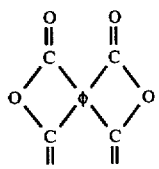 (DAH1)

 (DA1)

 (MA1)

(in the general formula (DAH1), φ represents a quadrivalent organic group; in the general formula (DA1), φ represents a bivalent organic group; and in the general formula (MA1), β represents a monovalent organic group).

7. The polyimide precursor composition according to claim 6, wherein said tetracarboxylic dianhydride represented by the general formula (DAH1) is at least one compound selected from the group consisting of compounds represented by the following general formulas (DAH2), (DAH3) and (DAH4):

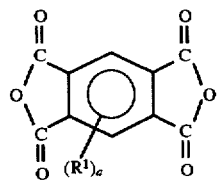
(DAH2)

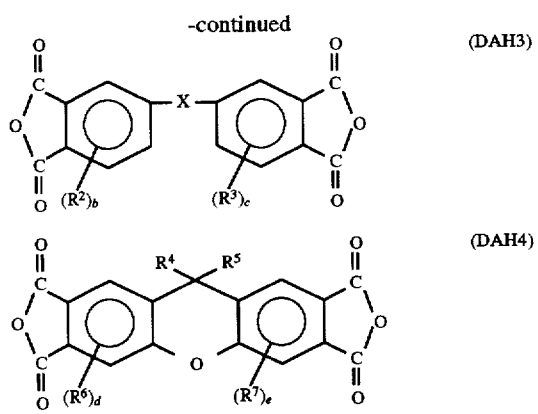

(in the general formula (DAH2), $R^1$s may be the same or different and are individually fluoro group or unsubstituted or fluorine-substituted aliphatic hydrocarbon group; "a" is an integers ranging from 0 to 2;

in the general formula (DAH3), X is a bivalent oxy group, thio group, sulfonyl group, carbonyl group, peralkylpolysiloxanylene, unsubstituted or fluorine-substituted aliphatic hydrocarbon group, aromatic hydrocarbon group or a single bond; $R^2$ and $R^3$ may be the same or different and are individually fluoro group or unsubstituted or fluorine-substituted aliphatic hydrocarbon group; b and c are integers each ranging from 0 to 3; and in the general formula (DAH4), $R^4$, $R^5$, $R^6$ and $R^7$ may be the same or different and are individually fluoro group or unsubstituted or fluorine-substituted aliphatic hydrocarbon group; d and e are integers each ranging from 0 to 2).

8. The polyimide precursor composition according to claim 6, wherein said diamine compound contains 0.8 molar equivalent or more of a compound represented by the following general formula (DA2):

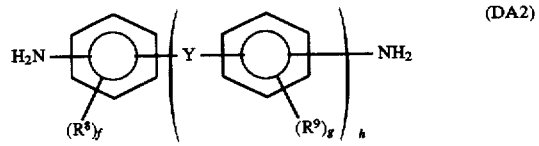

(in this general formula (DA2), Y is a bivalent oxy group, thio group, sulfonyl group, carbonyl group, peralkylpolysiloxanylene, unsubstituted or fluorine-substituted aliphatic hydrocarbon group or a single bond; $R^8$ and $R^9$ may be the same or different and are individually fluoro group or unsubstituted or fluorine-substituted aliphatic hydrocarbon group; f and g are integers each ranging from 0 to 4; and h is an integer ranging from 0 to 6).

9. The polyimide precursor composition according to claim 8, wherein said diamine compound represented by the general formula (DA2) contains 0.4 molar equivalent or more of an aromatic diamine compounds represented by the general formula (DA3) shown below

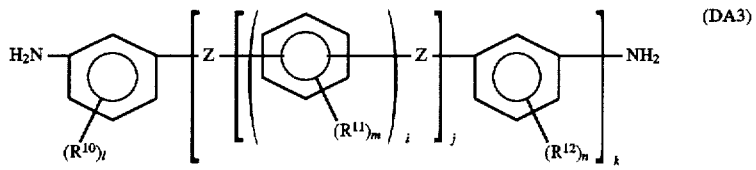
(DA3)

(in this general formula (DA3), Z is a bivalent oxy group, thio group, sulfonyl group, carbonyl group, peralkylpolysiloxanylene, unsubstituted or fluorine-substituted aliphatic hydrocarbon group or a single bond; $R^{10}$, $R^{11}$ and $R^{12}$ may be the same or different and are individually fluoro group or unsubstituted or fluorine-substituted aliphatic hydrocarbon group; i is a integer ranging from 1 to 6; j is an integer ranging from 0 to 4, k is 0 or 1; and l, m and n are integers each ranging from 0 to 4).

10. The polyimide precursor composition according to claim 1, wherein said cure accelerator is contained at a ratio of 0.2 to 4.0 molar equivalent per molar equivalent of the repeating unit of said polyamic acid.

11. The polyimide precursor composition according to claim 1, wherein said cure accelerator formed of a substituted or unsubstituted nitrogen-containing heterocyclic compound exhibiting an acid dissociation index "pKa" of a proton complex ranging from 0 to 8 in an aqueous solution thereof (AC1) is selected from the group consisting of substituted or unsubstituted imidazole, pyrazole, triazole, tetrazole, benzimidazole, naphtimidazole, indazole, benzotriazole, purine, imidazoline, pyrazoline, pyridine, quinoline, isoquinoline, dipyridyl, diquinolyl, pyridazine, pyrimidine, pyrazine, phthalazine, quinoxaline, quinazoline, cinnoline, naphthylidine, acridine, phenanthridine, benzoquinoline, benzisoquinoline, benzocinnoline, benzophthalazine, benzoquinoxaline, benzoquinazoline, phenanthroline, phenazine, carboline, perimidine, triazine, tetrazine, pteridine, oxazole, benzoxazole, isoxazole, benzisoxazole, thiazole, benzothiazole, isothiazole, benzisothiazole, oxadiazole, thiadiazole, pyrroledione, isoindoledione, pyrrolidinedione, benzisoquinolinedione, triethylene diamine, hexamethylene tetramine and an N-oxide compound of these nitrogen-containing heterocyclic compounds.

12. The polyimide precursor composition according to claim 11, wherein said cure accelerator formed of a substituted or unsubstituted nitrogen-containing heterocyclic compound exhibiting an acid dissociation index "pKa" of a proton complex ranging from 0 to 8 in an aqueous solution thereof (AC1) is selected from;

the group consisting of substituted or unsubstituted imidazole, pyrazole, triazole, tetrazole, benzimidazole, naphthimidazole, indazole, benzotriazole, purine, imidazoline, pyrazoline, quinoline, isoquinoline, dipyridyl, diquinolyl, pyridazine, phthalazine, quinoxaline, quinazoline, cinnoline, naphthylidine, acridine, phenanthridine, benzoquinoline, benzisoquinoline, benzocinnoline, benzophthalazine, benzoquinoxaline, benzoquinazoline, phenanthroline, phenazine, carboline, perimidine, pteridine, triethylenediamine, and hexamethylenetetramine; or the group consisting of pyridine, pyridazine, pyrimidine, pyrazine, triazine, tetrazine, oxazole, benzooxazole, isooxazole, benzoisooxazole, thiazole, benzothiazole, isothiazole, benzoisothiazole, oxadiazole, thiadiazole, pyrroledione, isoindoledione, pyrrolidinedione, and benzisoquinolinedione, each substituted by at one group selected from the group consisting of hydroxyl group, oxy group, di-substituted amino group, mono-substituted amino group, cyclic amino group, acylamino group, amino group, hydroxyamino group, ureide group, oxime group, hydroxyalkyl group, hydroxyaryl group, nitro group, mercapto group, carboxyl group, aminocarbonyl group, acyl group, sulfonic group, aminosulfonyl group and azo group; or the group consisting of an N-oxide compound of these nitrogen-containing heterocyclic compounds.

13. The polyimide precursor composition according to claim 1, wherein said cure accelerator formed of a substituted or unsubstituted amino acid compound (AC2) is selected from the group consisting of substituted or unsubstituted glycine, sarcosine, dimethyl glycine, betaine, alanine, β-alanine, α-aminobutyric acid, β-aminobutyric acid, γ-aminobutyric acid, γ-amino-β-oxobutyric acid, valine, β-aminoisovaleric acid, γ-aminoisovaleric acid, norvaline, β-aminovaleric acid, γ-aminovaleric acid, δ-aminovaleric acid, leucine, isoleucine, norleucine, serine, α-methyl serine, isoserine, α-methyl isoserine, cycloserine, homoserine, threonine, o-methyl threonine, allothreonine, o-methyl allothreonine, roseonine, trans-3-aminocyclohexane carboxylic acid, cis-3-aminocyclohexane carboxylic acid, ε-amine caproic acid, ω-aminododecanoic acid, β-hydroxyvaline, β-hydroxyisoleucine, α-hydroxy-β-aminoisovaleric acid, ε-diazo-δ-oxonorleucine, α-amino-ε-hydroxyaminocaproic acid, cysteine, cystine, S-methylcysteine, S-methylcysteine-S-oxide, cysteic acid, homocysteine, homocystine, methionine, penicillamine, taurine, α,β-diaminopropionic acid, ornithine, lysine, arginine, canaline, canavanine, δ-hydroxylysine, aspartic acid, asparagine, isoasparagine, glutamic acid, glutamine, isoglutamine, α-methylglutamic acid, β-hydroxyglutamic acid, γ-hydroxyglutamic acid, α-aminoadipic acid, citrulline, lanthionine, cystathionine, phenylalanine, α-methylphenylalanine, o-chlorophenylalanine, m-chlorophenylalanine, p-chlorophenylalanine, o-fluorophenylalanine, m-fluorophenylalanine, p-fluorophenylalanine, β-(2-pyridyl)alanine, tyrosine, thyronine, dichlorotyrosine, dibromotyrosine, diiodotyrosine, 3,4-dihydroxyphenylalanine, α-methyl-3,4-dihydroxyphenylalanine, phenylglycine, tryptophan, abrine, histidine, 1-methylhistidine, 2-mercaptohistidine, proline, hydroxyproline, anthranilic acid, paraminal and substituted amino compound in which amino group of these amino acid compound is substituted with a characteristic group.

14. The polyimide precursor compound according to claim 13, wherein at least one amino acid compound is contained, said amino acid compound being selected from the group consisted of N-acylamino acid compound in which the amino group of the amino acid compound is substituted with acyl group and N-aryl (or heteroaryl) amino acid compound in which the amino group of the amino acid compound is substituted with aromatic hydrocarbon group or aromatic heterocyclic group.

15. The polyimide precursor composition according to claim 1, wherein said cure accelerator formed of an aromatic hydrocarbon compound or an aromatic heterocyclic compound having a molecular weight of 1,000 or less and two or more hydroxyl groups (AC3) is a polyhydroxy compound represented by the following general formula (PHD)

(PHD)

wherein $Ar^1$ and $Ar^2$ may be the same or different and are individually a substituted or unsubstituted aromatic hydrocarbon group or aromatic heterocyclic ring; $X^1$ may be the same or different and is selected from a bivalent organic group and a single bond; u represents 0 or 1; and v and w are integers ranging from 0 to 5 and meet the condition of $v+w \geq 2$.

16. The polyimide precursor composition according to claim 1, wherein said cure accelerator formed of an aromatic hydrocarbon compound or an aromatic heterocyclic compound having a molecular weight of 1,000 or less and two or more hydroxyl groups (AC3) is a two or more hydroxyl group-substituted aromatic ring compound, said aromatic ring compound being selected from the group consisting of benzene, naphthalene, anthracene, anthraquinone, phenanthrene, phenanthrenequinone, fluorene, fluorenone, pyrrole, indole, isoindole, carbazole, furan, coumarone, isobenzofuran, thiophene, benzothiophene, dibenzothiophene, benzodioxole, benzodioxane, biphenyl, acetophenone, propiophenone, butyrophenone, benzophenone, benzoic ester, benzene dicarboxylic diester, benzamide, benzonitrile, benzaldehyde, alkoxybenzene, benzyl alcohol, nitrobenzene, benzenesulfonic acid, aniline, dephenyl ether, diphenylsulfone, diphenylmethane, diphenylethane, diphenylpropane, diphenyldifluoromethane, diphenyltetrafluoroethane, diphenylhexafluoropropane, diphenylamine, diphenylmethylamine, triphenylamine, triphenylmethane, triphenyl methanol and fuchsone.

17. A method of forming a polyimide film, which comprises the steps of;

coating a polyimide precursor composition on a surface of an object to be coated, said polyimide precursor composition comprising a polyamic acid having a repeating unit represented by the following general formula (PA); and at least one kinds of cure accelerator selected from the group consisting of a substituted or unsubstituted nitrogen-containing heterocyclic compound exhibiting an acid dissociation index "pKa" of a proton complex ranging from 0 to 8 in an aqueous solution thereof, or an N-oxide compound of said nitrogen-containing heterocyclic compound (AC1), a substituted or unsubstituted amino acid compound or an N-acylamino compound (AC2), and an aromatic hydrocarbo compound or an aromatic heterocyclic compound having a molecular weight of 1,000 or less and two or more hydroxyl groups (AC3):

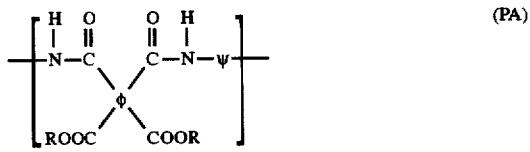
(PA)

wherein φ is a quadrivalent organic group; φ is a bivalent organic group; R is a substituted or unsubstituted hydrocarbo group or hydrogen atom; and heating the polyimide precursor composition at a temperature ranging from 60° to 400° C. thereby curing said polyimide precursor compoisition.

18. The method of forming a polyimide film according to claim 17, wherein after coating a polyimide precursor composition on a surface of an object, drying the polyimide precursor composition by heating at a temperature of 200° C. or less, if required; and heating the polyimide precursor composition at a temperature ranging from 100° to 300° C. in air atmosphere or inert gas atmosphere; or in a double-heating process, i.e. at first at a temperature ranging from 60° to 250° C. in air atmosphere or inert gas atmosphere and then at a temperature ranging from 60° to 250° C. under vacuum; thereby curing said polyimide precursor composition.

19. Electronic parts provided with an insulating film or a passivation film formed of a polyimide film; said polyimide film being formed through a curing of a polyimide precursor composition comprising a polyamic acid having a repeating unit represented by the following general formula (PA); and at least one kinds of cure accelerator selected from the group consisting of a substituted or unsubstituted nitrogen-containing heterocyclic compound exhibiting an acid dissociation index "pKa" of a proton complex ranging from 0 to 8 in an aqueous solution thereof, or an N-oxide compound of said nitrogen-containing heterocyclic compound (AC1), a substituted or unsubstituted amino acid compound (AC2), and an aromatic hydrocarbon compound or an aromatic heterocyclic compound having a molecular weight of 1,000 or less and two or more hydroxyl groups (AC3):

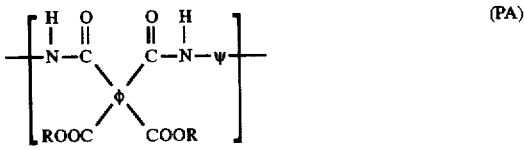
(PA)

wherein φ is a quadrivalent organic group; φ is a bivalent organic group; R is a substituted or unsubstituted hydrocarbon group, organosilicic group or hydrogen atom.

20. A liquid crystal element which is provided with a polyimide film functioning as a liquid crystal orienting film, said polyimide film being formed through a curing of a polyimide precursor composition comprising a polyamic acid having a repeating unit represented by the following general formula (PA); and at least one kinds of cure accelerator selected from the group consisting of a substituted or unsubstituted nitrogen-containing heterocyclic compound exhibiting an acid dissociation index "pKa" of a proton complex ranging from 0 to 8 in an aqueous solution thereof, or an N-oxide compound of said nitrogen-containing heterocyclic compound (AC1), a substituted or unsubstituted amino acid compound (AC2), and an aromatic hydrocarbon compound or an aromatic heterocyclic compound having a molecular weight of 1,000 or less and two or more hydroxyl groups (AC3):

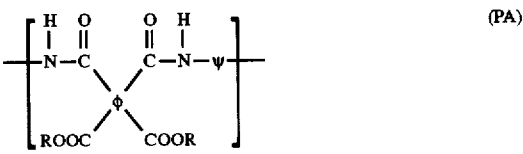
(PA)

wherein φ is a quadrivalent organic group; φ is a bivalent organic group; R is a substituted or unsubstituted hydrocarbon group, organosilicic group or hydrogen atom.

* * * * *